US012442466B2

(12) United States Patent
Lindsay et al.

(10) Patent No.: US 12,442,466 B2
(45) Date of Patent: Oct. 14, 2025

(54) INSTALLATION INTEGRITY DETECTOR FOR SOLENOID VALVE

(71) Applicant: Automatic Switch Company, Florham Park, NJ (US)

(72) Inventors: Peter Lindsay, Wantage, NJ (US); Frank A. Ferrarese, West Caldwell, NJ (US); Michael A. Brendel, Morristown, NJ (US)

(73) Assignee: Automatic Switch Company, Florham Park, NJ (US)

( * ) Notice: Subject to any disclaimer, the term of this patent is extended or adjusted under 35 U.S.C. 154(b) by 41 days.

(21) Appl. No.: 17/207,430

(22) Filed: Mar. 19, 2021

(65) Prior Publication Data

US 2021/0293353 A1 Sep. 23, 2021

Related U.S. Application Data

(60) Provisional application No. 62/992,857, filed on Mar. 20, 2020.

(51) Int. Cl.
*F16K 37/00* (2006.01)
*F16K 31/06* (2006.01)

(52) U.S. Cl.
CPC ...... *F16K 37/0041* (2013.01); *F16K 31/0675* (2013.01)

(58) Field of Classification Search
CPC .......................... F16K 37/0041; F16K 31/0675
See application file for complete search history.

(56) References Cited

U.S. PATENT DOCUMENTS

| 3,665,960 | A | | 5/1972 | Skinner et al. |
| 3,742,162 | A | * | 6/1973 | Wasemann ............. H01H 9/226 228/114.5 |
| 4,351,394 | A | | 9/1982 | Enk |
| 4,469,304 | A | * | 9/1984 | Kah, Jr. ................ F16K 31/082 251/65 |
| 4,579,315 | A | | 4/1986 | Kowalski |
| 5,236,049 | A | | 8/1993 | Asselin et al. |
| 5,565,770 | A | * | 10/1996 | Jones ..................... G01D 5/145 324/262 |
| 5,729,164 | A | | 3/1998 | Pattantyus |
| 5,857,525 | A | | 1/1999 | Okamoto et al. |

(Continued)

FOREIGN PATENT DOCUMENTS

| CN | 103354759 A | 10/2013 |
| EP | 3455530 A1 | 3/2019 |

OTHER PUBLICATIONS

International Search Report and Written Opinion dated Jul. 2, 2021 for International Application No. PCT/US2021/023349.

(Continued)

*Primary Examiner* — Angelisa L. Hicks
(74) *Attorney, Agent, or Firm* — Mackey Law Firm PLLC

(57) ABSTRACT

A solenoid valve can include a valve body and an actuator. The actuator can include an actuator housing, a coil disposed in the actuator housing and a core tube extending from the valve body through and beyond the actuator housing when the actuator is properly installed on the valve body. A monitoring assembly can include a target on the core tube and a detector configured to detect the target when the actuator is properly installed on the valve body and/or core tube.

20 Claims, 20 Drawing Sheets

(56) References Cited

U.S. PATENT DOCUMENTS

| | | | |
|---|---|---|---|
| 6,991,211 B2* | 1/2006 | Altonji | F16K 31/34 |
| | | | 251/30.02 |
| 7,083,157 B2 | 8/2006 | Kingsford et al. | |
| 7,185,711 B2 | 3/2007 | Jackson et al. | |
| 7,322,372 B2 | 1/2008 | Trapp | |
| 7,889,091 B2 | 2/2011 | Goon | |
| 8,122,968 B2 | 2/2012 | Johnson | |
| 8,209,061 B2 | 6/2012 | Palmer et al. | |
| 8,307,906 B2 | 11/2012 | Reilly et al. | |
| 9,168,407 B2 | 10/2015 | Kho et al. | |
| 9,255,643 B2 | 2/2016 | Robinson | |
| 9,620,317 B1* | 4/2017 | Hacker | H01H 36/0073 |
| 9,714,718 B2 | 7/2017 | Rogala et al. | |
| 9,890,873 B2 | 2/2018 | Schwobe et al. | |
| 9,974,988 B2 | 5/2018 | Baxendell et al. | |
| 10,066,761 B1 | 9/2018 | Hernu et al. | |
| 10,088,073 B1* | 10/2018 | Kennedy | F16K 3/00 |
| 10,155,126 B2 | 12/2018 | Schwobe et al. | |
| 10,188,886 B2 | 1/2019 | Magee | |
| 2004/0036273 A1 | 2/2004 | McClary | |
| 2005/0192710 A1 | 9/2005 | Thornton et al. | |
| 2006/0021762 A1 | 2/2006 | Golinveaux | |
| 2010/0192695 A1 | 8/2010 | Mcsheffrey, Jr. et al. | |
| 2011/0050373 A1 | 3/2011 | Afountain et al. | |
| 2013/0126328 A1 | 5/2013 | Mainland et al. | |
| 2014/0203200 A1 | 7/2014 | Da Silva | |
| 2015/0041158 A1 | 2/2015 | Stumm et al. | |
| 2016/0123770 A1* | 5/2016 | Feucht | G01D 5/145 |
| | | | 324/207.2 |
| 2016/0215931 A1 | 7/2016 | Barnett et al. | |
| 2017/0225021 A1 | 8/2017 | Williams et al. | |
| 2017/0326395 A1* | 11/2017 | Schwobe | A62C 37/10 |
| 2018/0161610 A1* | 6/2018 | Kjellman | A62C 35/02 |
| 2019/0301648 A1 | 10/2019 | Leckner | |

OTHER PUBLICATIONS

"Chemetron Fire Systems FM-200" fm200.co.id (Jul. 1, 2000) http://fm200.co.id/documentation/manual-book/Chemetron%20FM200%20Sigma%20Series%20Engineered%20System.pdf.

"Novec 1230 Fire Suppression System for Fire Protection" incontrolsystem.net (Nov. 21, 2013) https://web.archive.org/web/20131121040834/http://incontrolsystems.net/nov ec-1230/.

"Simplex 2010ES Fire Control Units" simplex-fire.com (2018) https://simplex-fire.com/en/us/DocumentsandMedia/4010-0007.PDF.

"SMC Solenoid Valve SYJ Series" content2.smcetech.com (2008) https://content2.smcetech.com/pdf/manuals/SYJ3000-OMM0002.pdf.

"Supervised Latching Solenoid Actuator" tlxtech.com (Nov. 25, 2014) https://www.tlxtech.com/solenoids/supervised-latching-solenoid-actuator.

"Supervision for Releasing Devices on Extinguishing Systems" tlxtech.com (Dec. 2015) https://www.tlxtech.com/understanding-solenoids/articles/supervision-forreleasing-devices-on-extinguishing-systems.

"Victaulic Vortex Fire Suppression System" victaulic.com (2011) https://www.victaulic.com/assets/uploads/literature/70.08.pdf.

* cited by examiner

INSTALLATION INTEGRITY DETECTOR FOR SOLENOID VALVE

CROSS REFERENCE TO RELATED APPLICATIONS

This application claims the benefit of U.S. Provisional Patent Application No. 62/992,857 filed Mar. 20, 2020, the entire contents of which are hereby incorporated by reference herein.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention. The present disclosure generally relates to valves and more specifically relates to solenoid valves.

Description of the Related Art Valves, such as solenoid valves, are used in numerous applications across numerous industries. For example, fire suppression systems use valves, such as solenoid valves, controlled by fire detection or fire alarm systems to initiate suppression a fire. In some such systems, a solenoid is activated to operate a discharge valve to release suppressant material to deliver the suppressant material to the fire.

Such solenoid valves, such as those used in fire suppression systems, are periodically tested to ensure that the magnetic coil contained therein is properly operating. A magnetic coil is removed from the solenoid valve, during this testing, and then reinstalled. It can be problematic if any of the magnetic coils are not reinstalled properly (or not reinstalled at all).

In this regard, the National Fire Protection Association has passed requirements that these fire suppression systems must be "supervised" and provide warning or indication of system impairment. Thus, a need exists in the art for improved devices, systems and methods for determining and/or indicating whether a valve actuator is properly installed.

BRIEF SUMMARY OF THE INVENTION

In at least one embodiment, a solenoid valve can include a valve body and an actuator. The valve body can include an inlet and an outlet for selective flow through the valve. The actuator can be coupled to the valve body and be configured to control flow from the inlet to the outlet. In at least one embodiment, the actuator comprises an actuator housing, a coil disposed in the actuator housing, and a core tube. In at least one embodiment, a portion of the core tube can extend through the coil while another portion of the core tube extends beyond the coil, when the actuator is properly installed on the valve body. In at least one embodiment, the core tube extends from the valve body and through the actuator housing and coil, with the actuator properly installed on the valve body.

In at least one embodiment, a solenoid valve can also include a monitoring assembly for monitoring whether the actuator is properly installed on the valve body and/or core tube. In at least one embodiment, the monitoring assembly includes a target on the core tube and a detector configured to detect whether or not the target is present. The detector and the target can be located such that the detector is able to detect the target when the actuator is properly installed on the valve body and/or core tube. In at least one embodiment, the detector is not able to detect the target when the actuator is improperly installed on the valve body and/or core tube.

In at least one embodiment, the monitoring assembly can be configured to trigger or provide an audible and/or visual indication of whether the target is detected. In at least one embodiment, the monitoring assembly can be configured to trigger or provide an audible and/or visual indication of whether the actuator is properly or improperly installed on the valve body and/or core tube. In at least one embodiment, the detector can include a switch or other sensor, such as a mechanical microswitch or a magnetic proximity switch. In at least one embodiment, the target can include a cam or other target profile in the core tube. In at least one embodiment, the target can be integral to the core tube or can be secured to an end of the core tube. In at least one embodiment, the target can include a ferromagnetic metal and the remaining portion of the core tube can be non-ferromagnetic. In at least one embodiment, the detector and/or the target can be contained within the actuator housing, or can be external thereto. In at least one embodiment, the detector is disposed on the actuator housing and the target is disposed on the core tube.

DESCRIPTION OF THE INVENTION

Figure 1A:
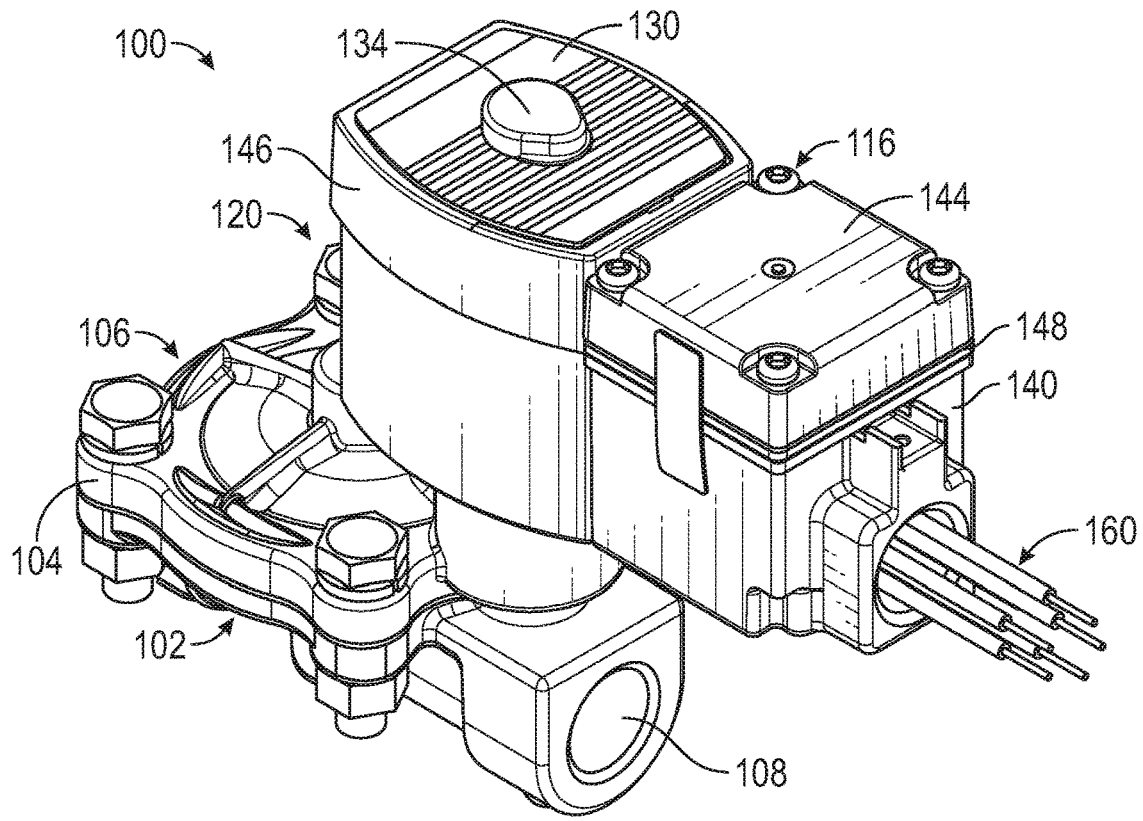
FIG. 1A is a perspective view of one of many embodiments of a valve and actuator system according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

Applicants have invented new and useful devices, assemblies, systems and methods for determining and/or indicating whether a valve actuator (e.g., a solenoid actuator or coil) is properly installed. In at least one embodiment, an actuator for a solenoid valve can include at least one of a switch and a sensor for determining and/or indicating whether the actuator is coupled to at least one of a valve body, an armature and a core tube, which can include determining and/or indicating whether the actuator is properly installed for supporting valve operation. In at least one embodiment, the actuator or a system coupled to the actuator can be configured to signal or otherwise indicate whether the actuator is coupled to and/or has been removed from one or more other components of the valve (e.g., valve body, armature, core tube). In at least one embodiment, a valve can be configured to provide or otherwise cause at least one of an audible indication and a visual indication when the actuator is not coupled to and/or is not properly coupled to one or more other components of the valve. In at least one embodiment, a valve actuator, such as a solenoid valve actuator, can include an indicator assembly for indicating whether the actuator is coupled to at least one of a valve body, an armature and a core tube. The indicator assembly can include an indicator configured to provide an indication based on communication with the core tube or a component coupled to the core tube. An indicator or indicator assembly can include at least one of a switch and a sensor. An indicator or indicator assembly can include a stem having a first end configured to contact a core tube and a second end longitudinally opposite the first end, and a switch. The stem can be biased away from the switch. The stem can be configured to open or close a switch when the stem is in or out of contact with a core tube, a portion of a core tube or a component coupled to a core tube. A sensor can be configured to open or close a switch in response to sensing communication with a core tube or a component coupled to a core tube, such as one or more targets. A sensor can be or include an optical sensor, a magnetic sensor, a mechanical sensor and/or other types of sensors, separately or in combination. In at least one embodiment, a stem or sensor can be configured to communicate with a cam, tongue, groove, shoulder, other profile shape, or target on the exterior surface of a core tube or otherwise disposed in or on a core tube.

In at least one embodiment, a solenoid valve can include a valve body and an actuator. The valve body can include an inlet and an outlet for selective flow through the valve. The actuator can be coupled to the valve body and be configured to control flow from the inlet to the outlet. In at least one embodiment, the actuator comprises an actuator housing, a coil disposed in the actuator housing, and a core tube. In at least one embodiment, a portion of the core tube can extend through the coil while another portion of the core tube extends beyond the coil, when the actuator is properly installed on the valve body. In at least one embodiment, the core tube extends from the valve body and through the actuator housing and coil, with the actuator properly installed on the valve body.

In at least one embodiment, a solenoid valve can also include a monitoring assembly for monitoring whether the actuator is properly installed on the valve body and/or core tube. In at least one embodiment, the monitoring assembly includes a target on the core tube and a detector configured to detect whether or not the target is present. The detector and the target can be located such that the detector is able to detect the target when the actuator is properly installed on the valve body and/or core tube. In at least one embodiment, the detector is not able to detect the target when the actuator is improperly installed on the valve body and/or core tube.

In at least one embodiment, the monitoring assembly can be configured to trigger or provide an audible and/or visual indication of whether the target is detected. In at least one embodiment, the monitoring assembly can be configured to trigger or provide an audible and/or visual indication of whether the actuator is properly or improperly installed on the valve body and/or core tube. In at least one embodiment, the detector can include a switch or other sensor, such as a mechanical microswitch or a magnetic proximity switch. In at least one embodiment, the target can include a cam or other target profile in the core tube. In at least one embodiment, the target can be integral to the core tube or can be secured to an end of the core tube. In at least one embodiment, the target can include a ferromagnetic metal and the remaining portion of the core tube can be non-ferromagnetic. In at least one embodiment, the detector and/or the target can be contained within the actuator housing, or can be external thereto. In at least one embodiment, the detector is disposed on the actuator housing and the target is disposed on the core tube.

Figure 1B:
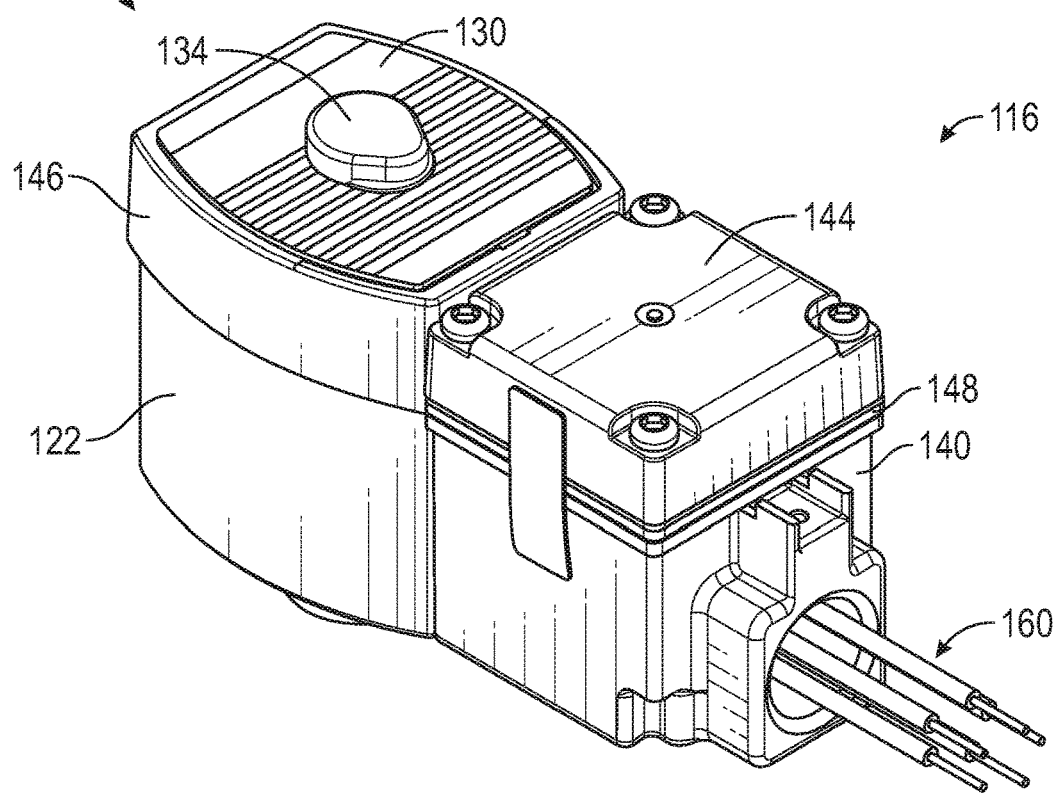
FIG. 1B is a perspective view of one of many embodiments of an actuator assembly according to the disclosure.
Figure 2A:
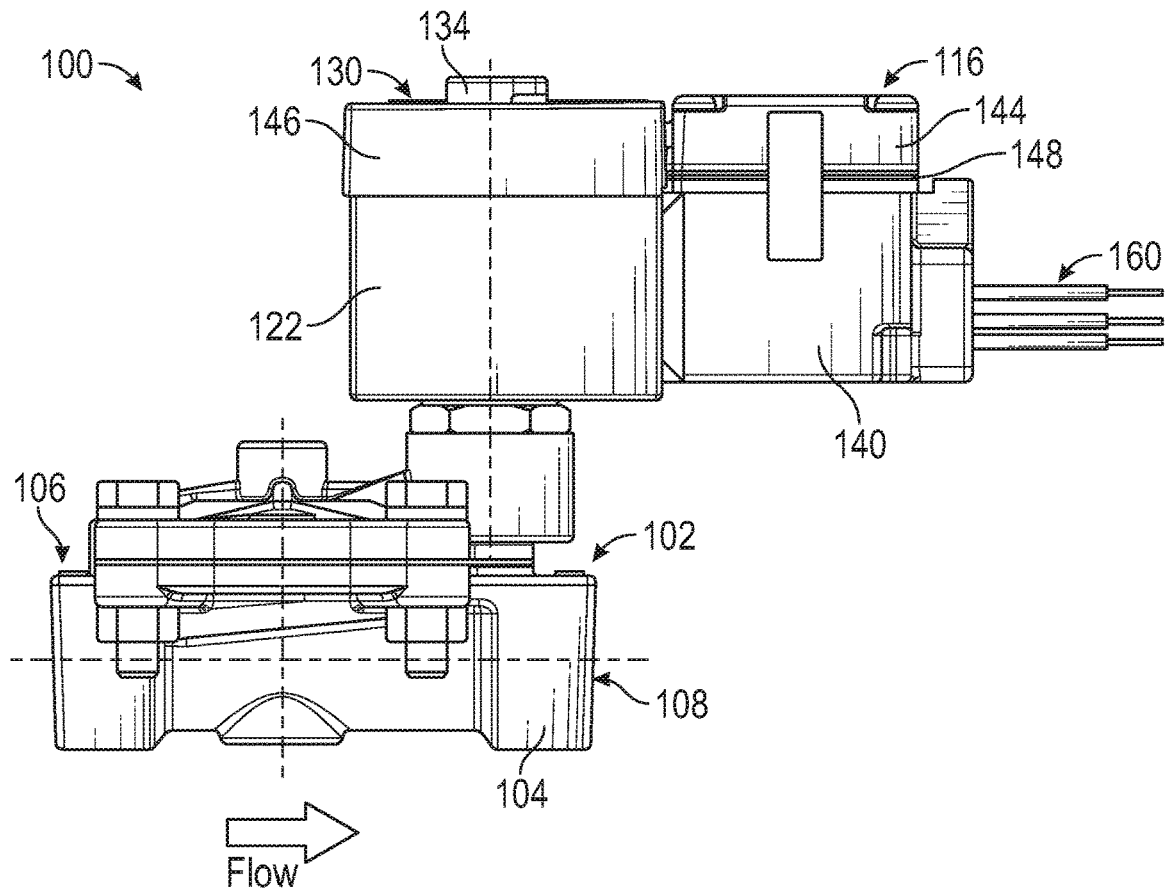
FIG. 2A is a side elevational view of one of many embodiments of a valve and actuator system according to the disclosure.
Figure 2B:
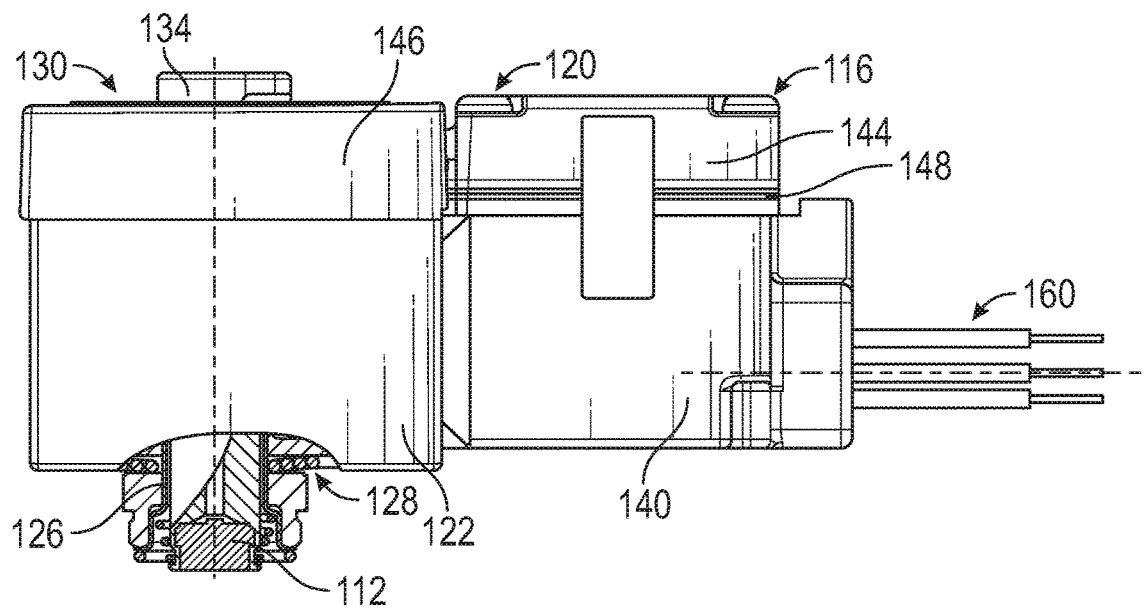
FIG. 2B is a side elevational view of one of many embodiments of an actuator assembly according to the disclosure with a portion cut away.
Figure 3A:
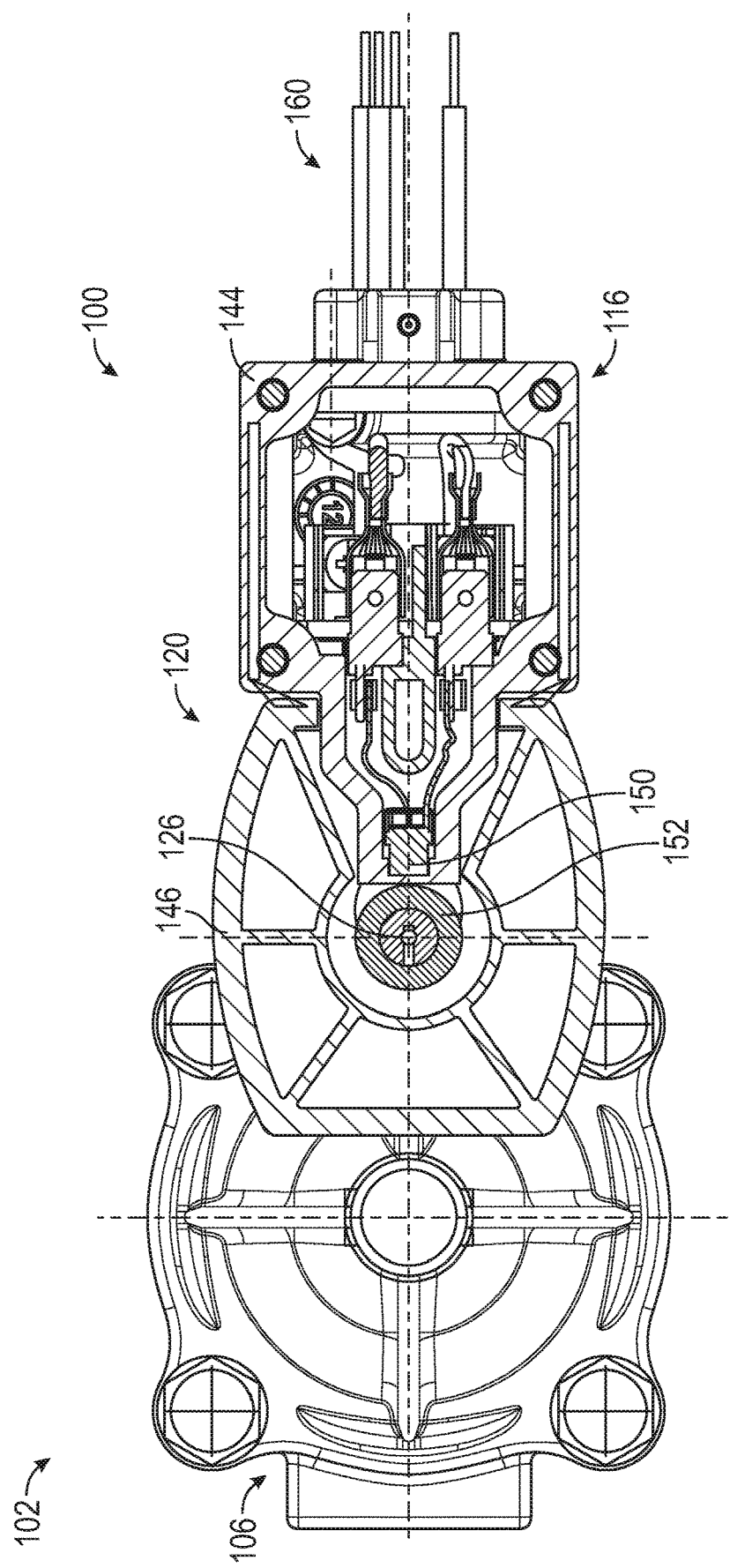
FIG. 3A is a top plan view of one of many embodiments of a valve and actuator system according to the disclosure with a portion of a monitoring assembly cut away.
Figure 3B:
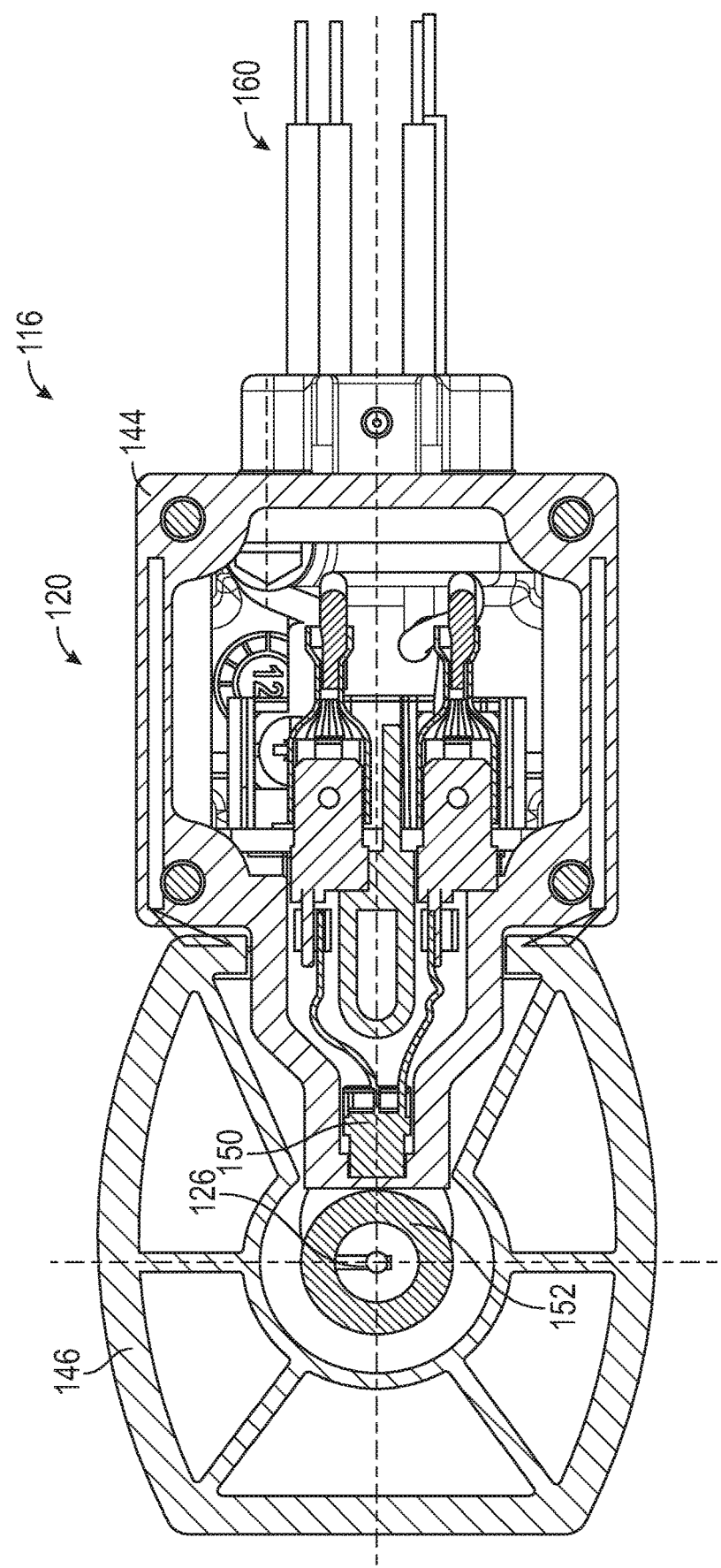
FIG. 3B is a top plan view of one of many embodiments of an actuator assembly according to the disclosure with a portion of a monitoring assembly cut away.
Figure 4A:
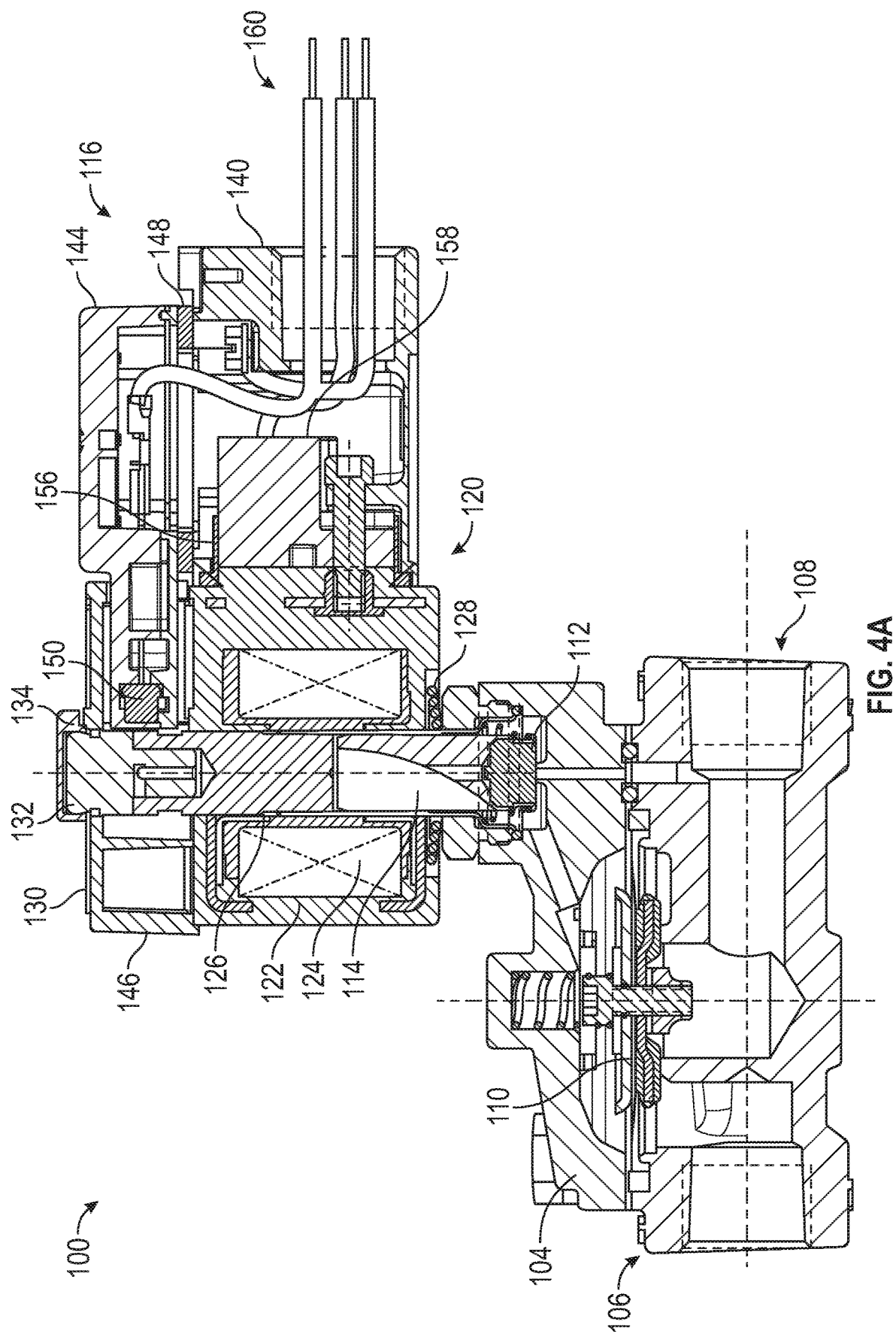
FIG. 4A is a side elevation sectional view of one of many embodiments of a valve and actuator system according to the disclosure.
Figure 4B:
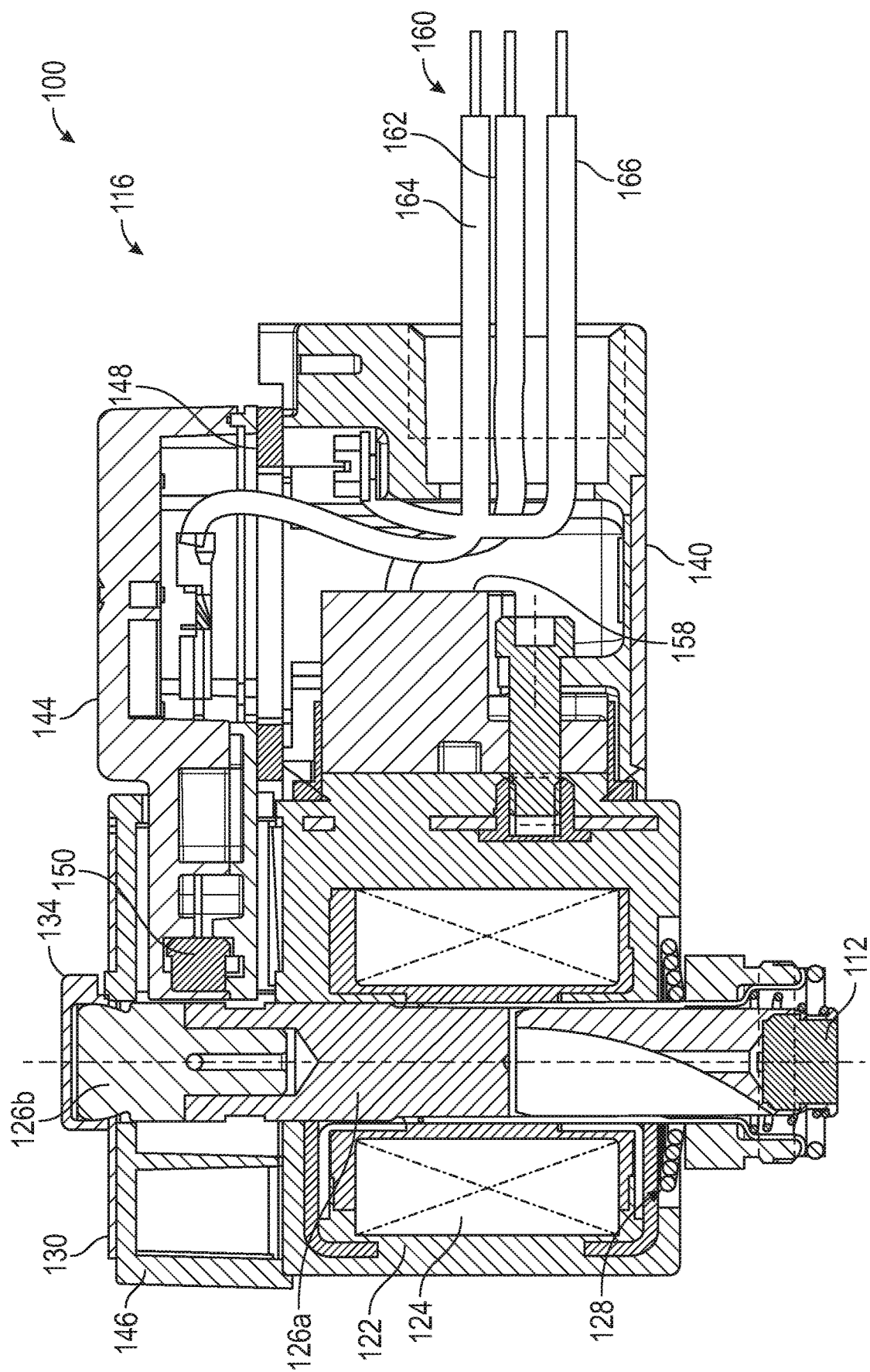
FIG. 4B is a side elevation sectional view of one of many embodiments of an actuator assembly according to the disclosure.
Figure 5A:
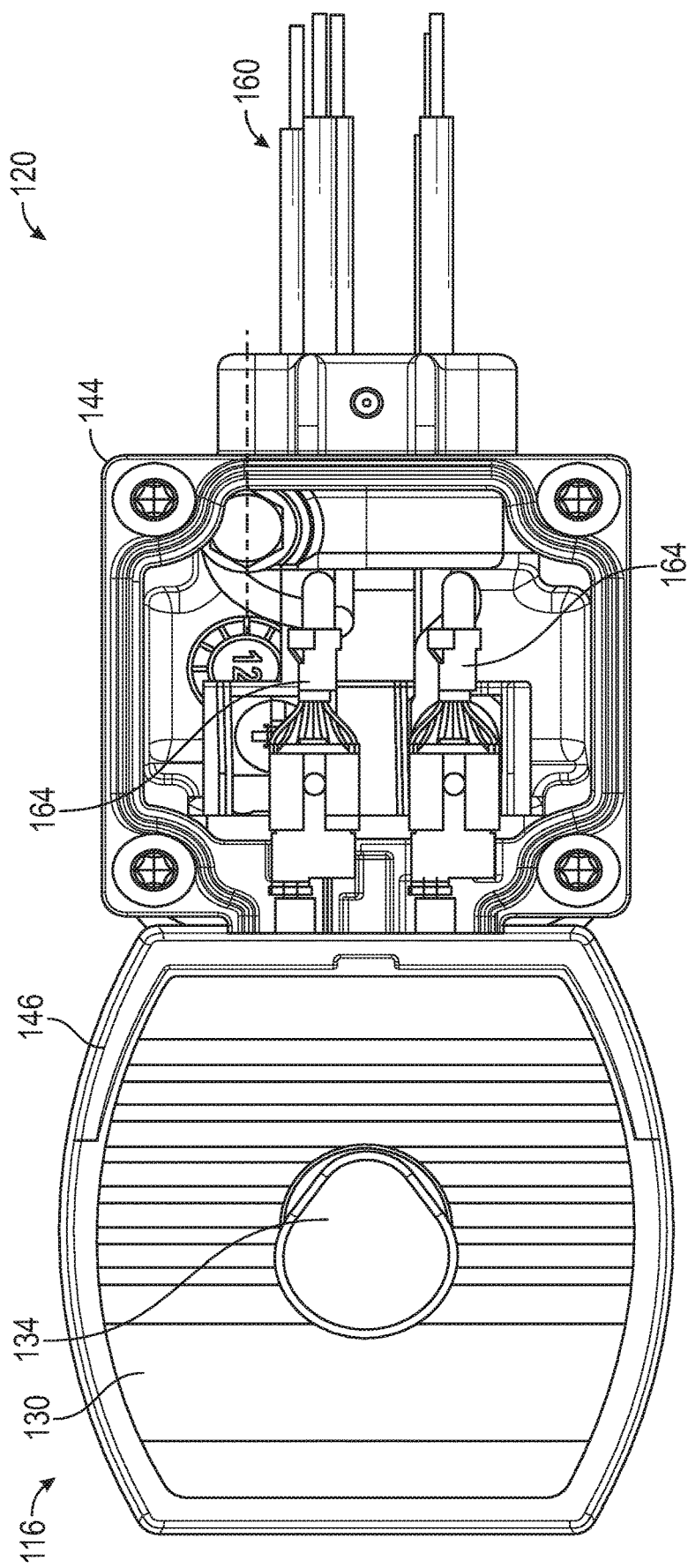
FIG. 5A is a top plan view of one of many embodiments of a valve and actuator system according to the disclosure with a portion of a monitoring assembly cut away.
Figure 5B:
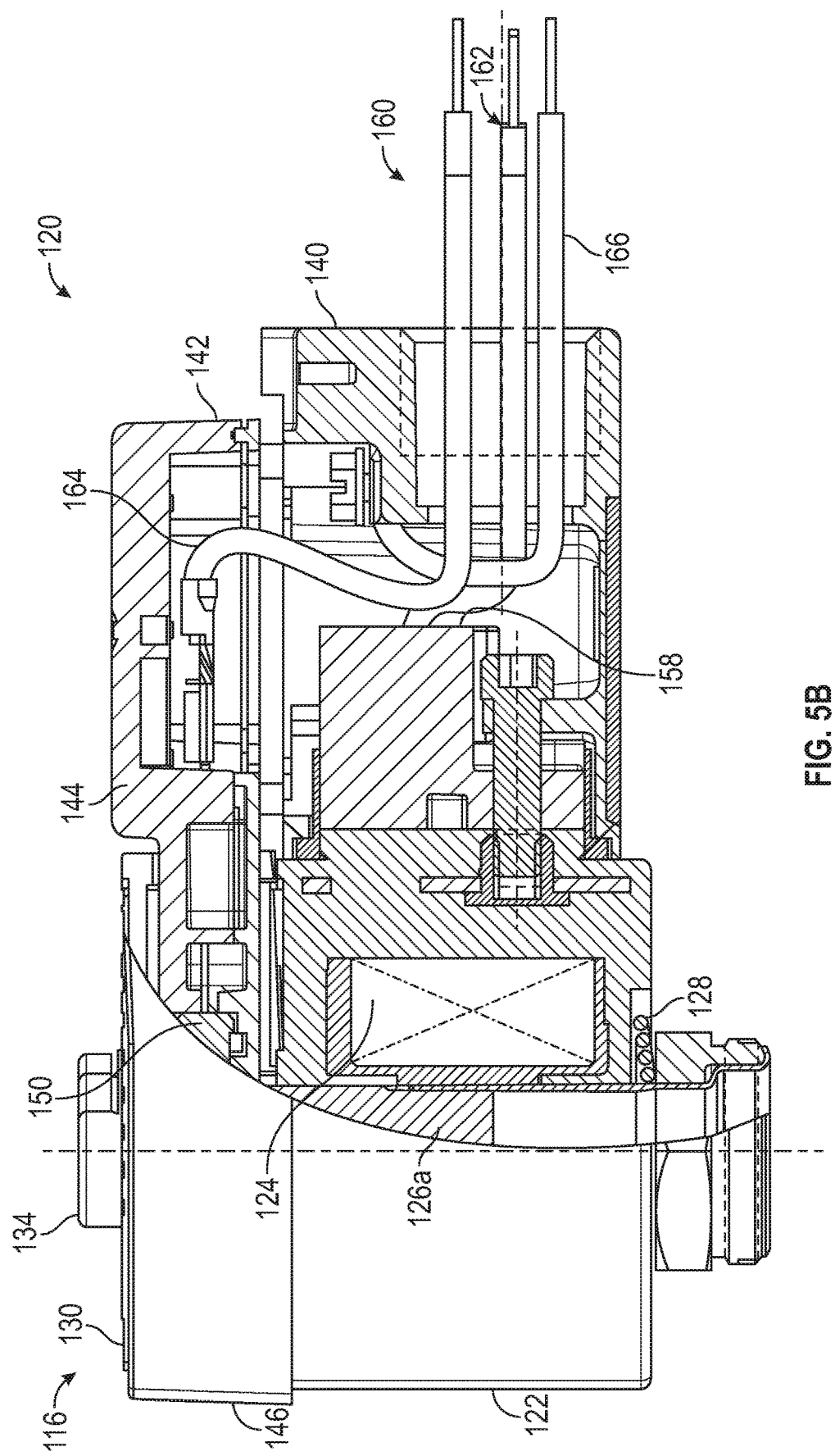
FIG. 5B is a side elevational view of one of many embodiments of an actuator assembly according to the disclosure with a portion cut away.
Figure 6A:
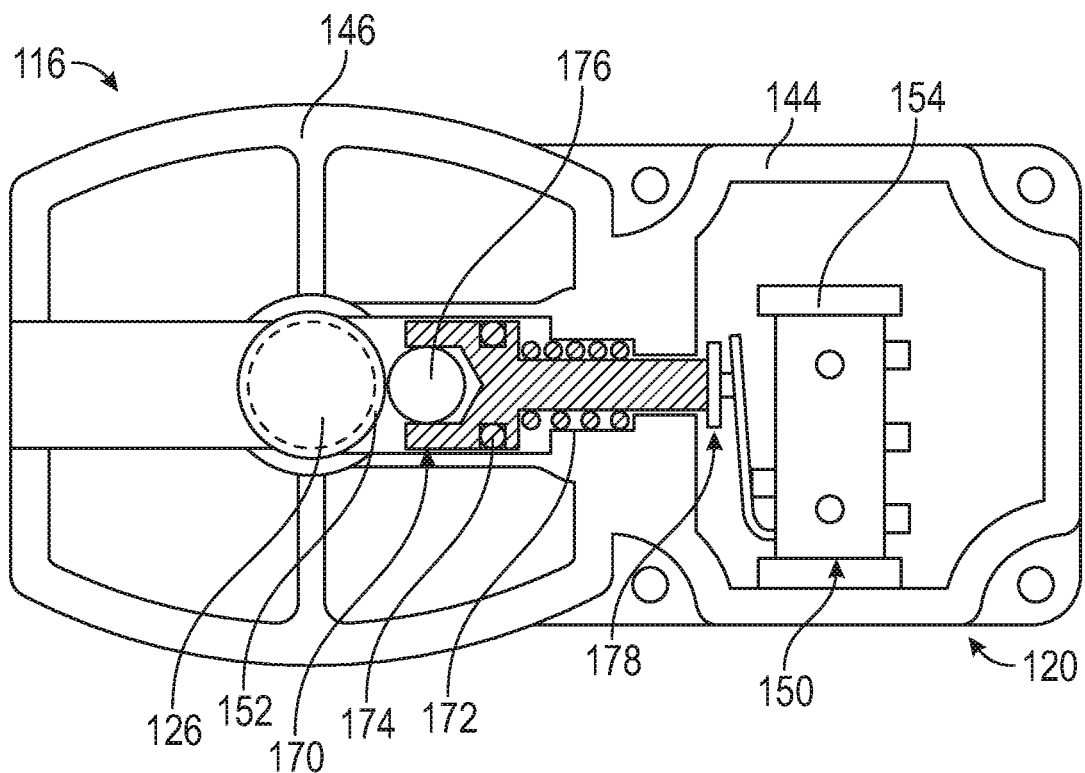
FIG. 6A is a top plan sectional view of one of many embodiments of an actuator assembly according to the disclosure.
Figure 6B:
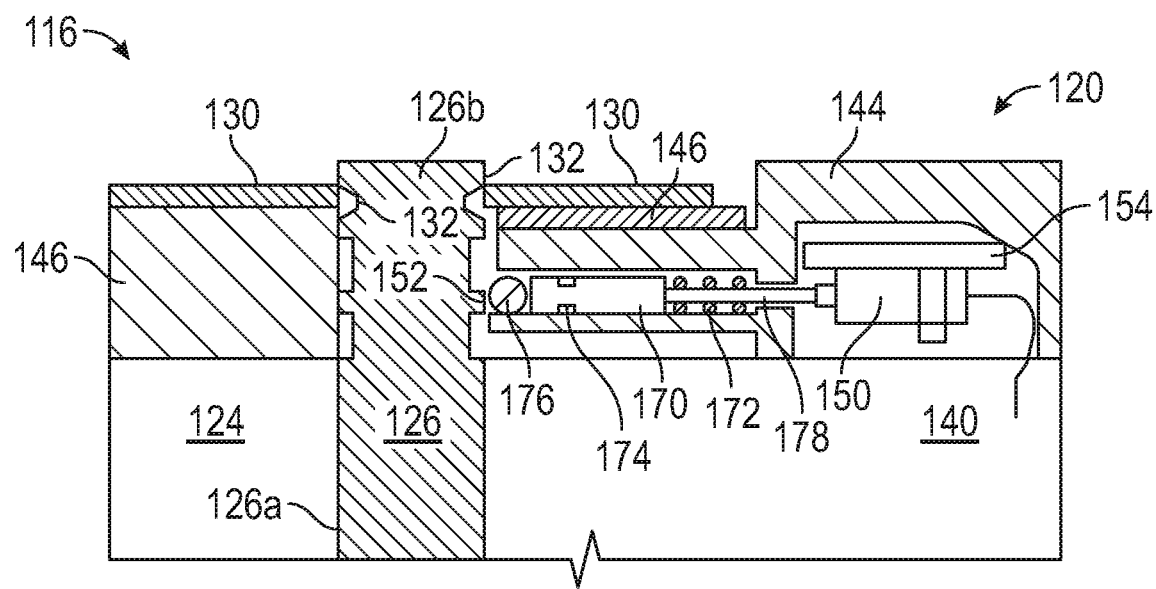
FIG. 6B is a side elevation sectional view of a portion of one of many embodiments of an actuator assembly according to the disclosure.
Figure 7:
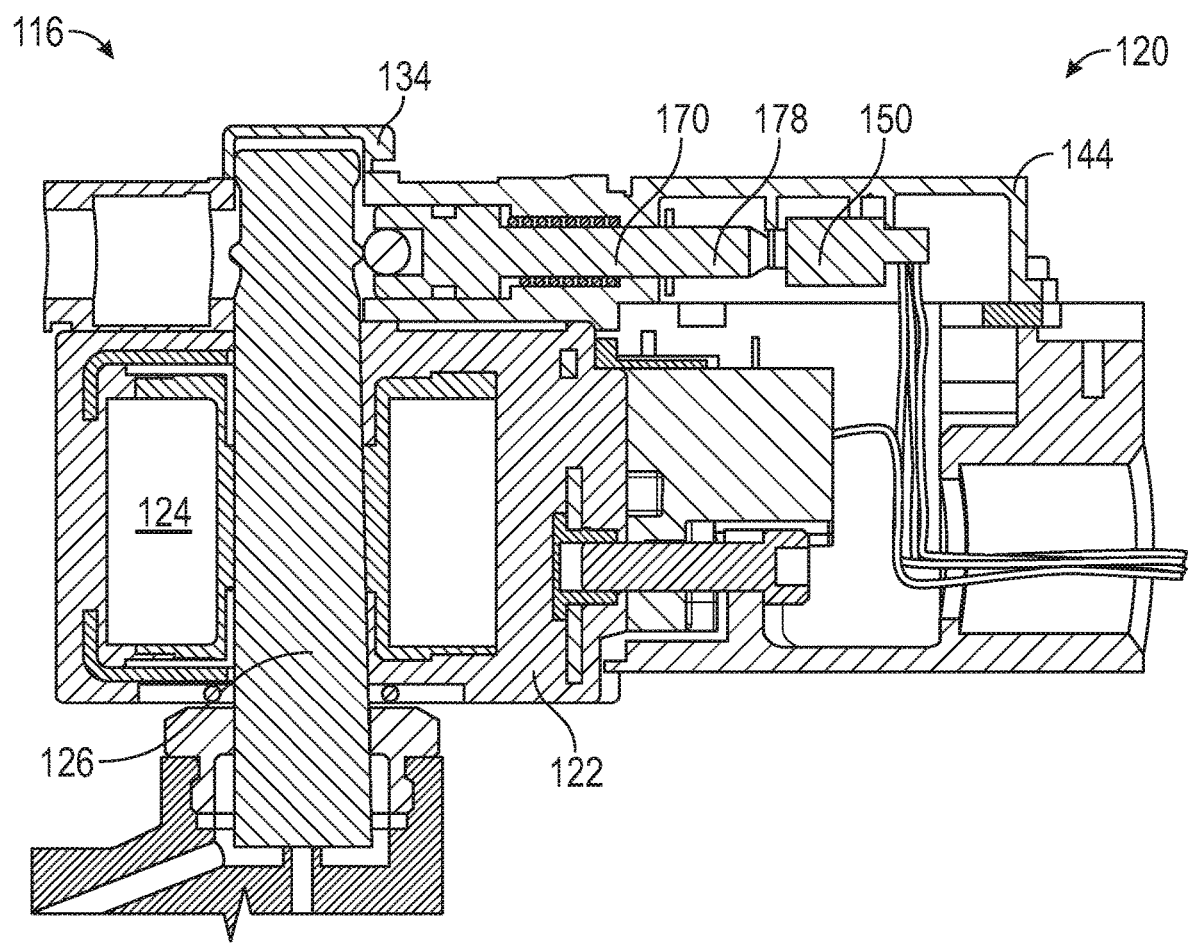
FIG. 7 is a side elevation sectional view of one of many embodiments of an actuator assembly according to the disclosure.
Figure 8:
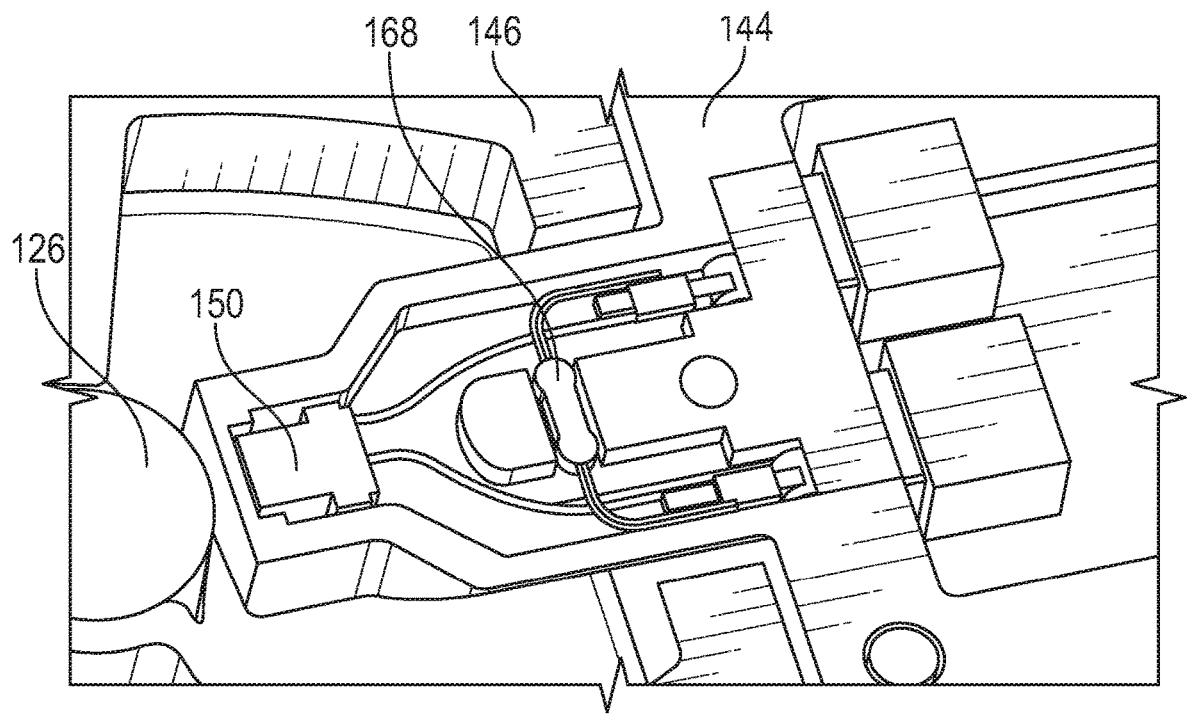
FIG. 8 is a perspective sectional view of a portion of one of many embodiments of an actuator assembly according to the disclosure.
Figure 9:
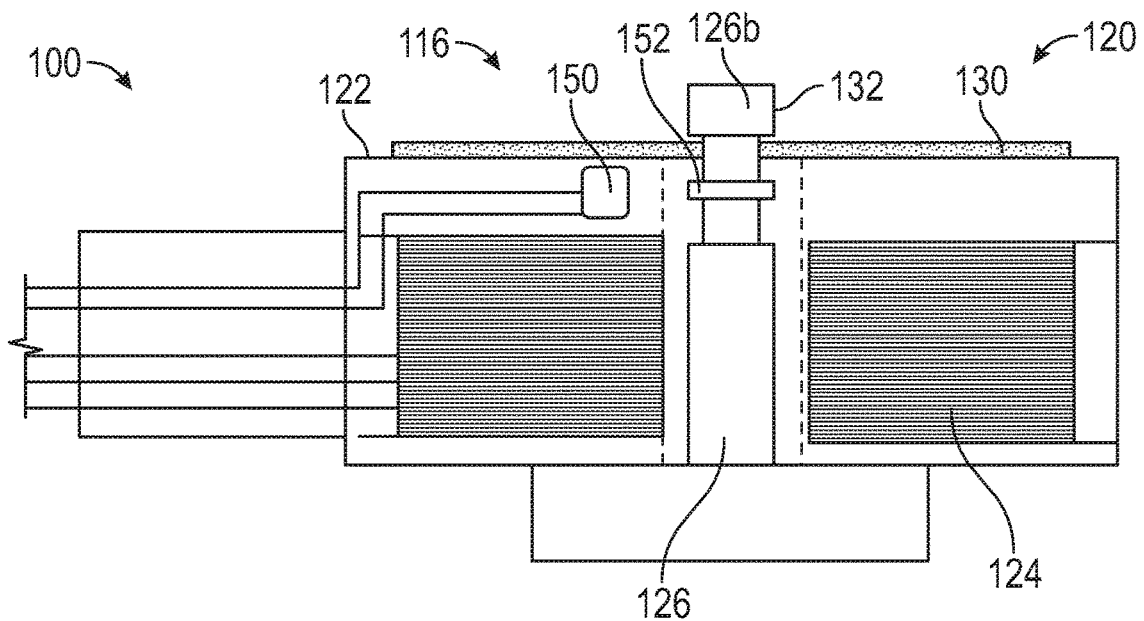
FIG. 9 is a simplified side elevation sectional view of one of many embodiments of an actuator assembly according to the disclosure.
Figure 10:
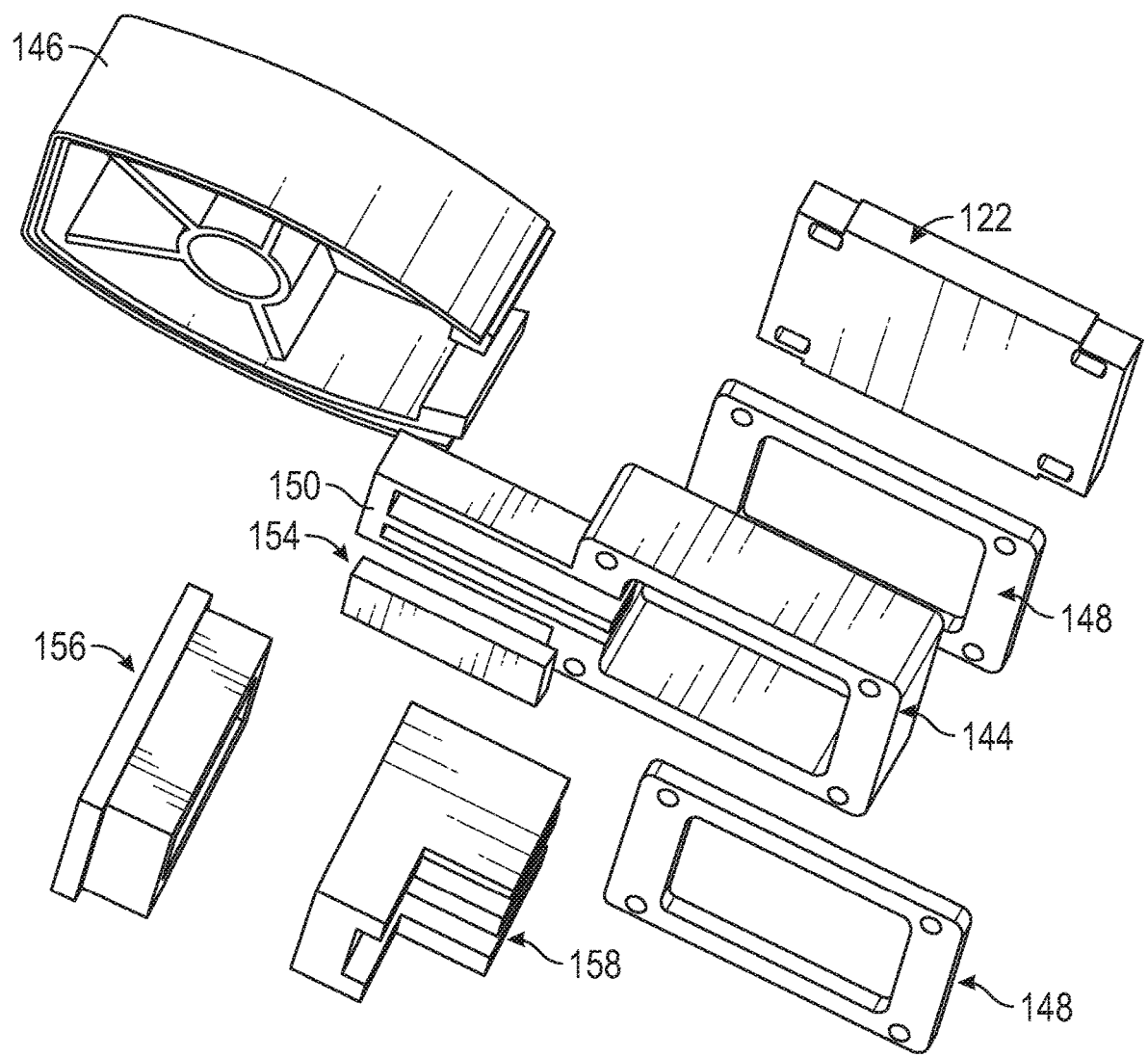
FIG. 10 is a partial exploded view of one of many embodiments of a monitoring assembly according to the disclosure.
Figure 11:
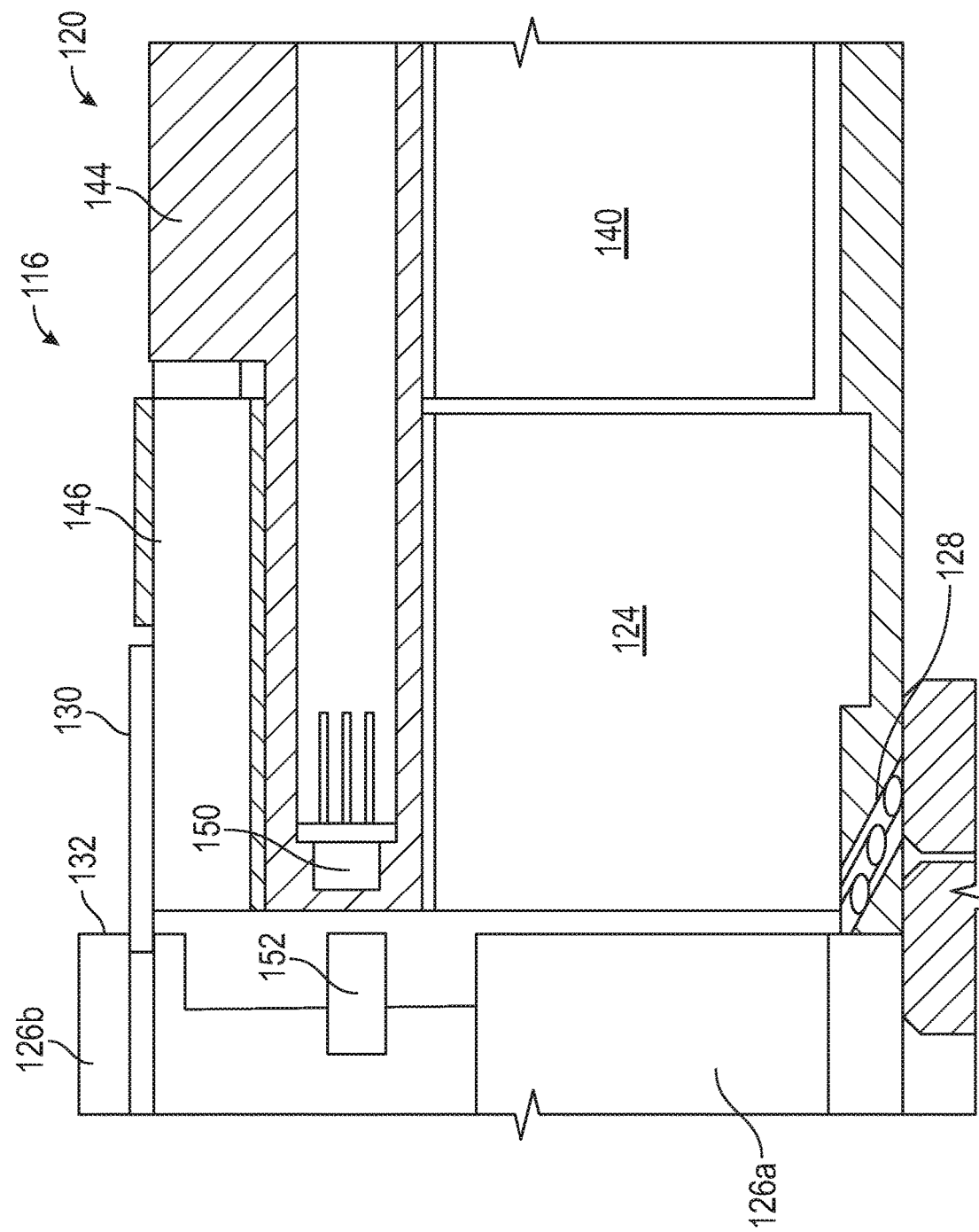
FIG. 11 is a partial side elevation sectional view of one of many embodiments of an actuator assembly according to the disclosure.
Figure 13B:
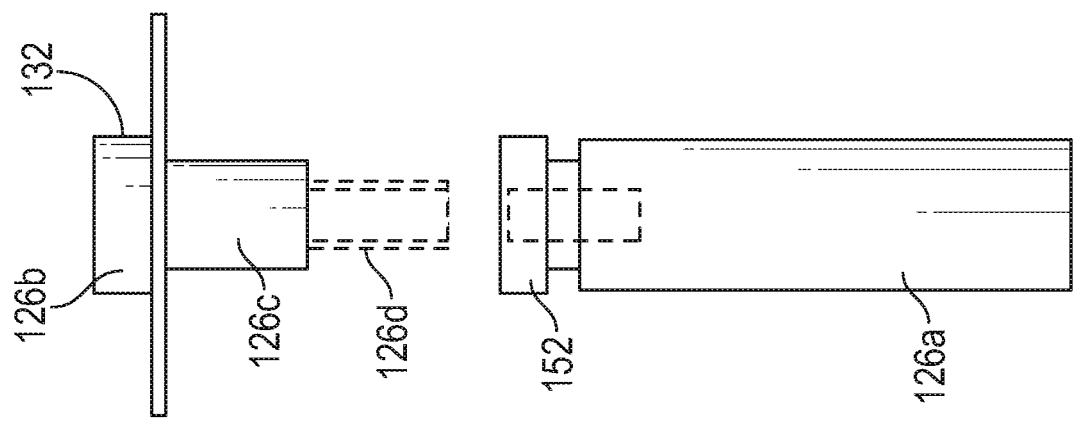
FIG. 13B is an exploded view of the core tube of FIG. 13A.
Figure 13A:
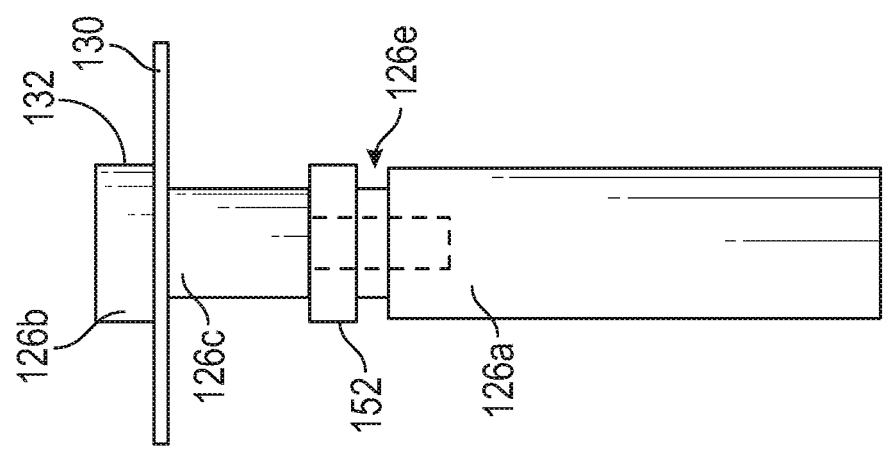
FIG. 13A is a simplified diagram of one of many embodiments of a core tube according to the disclosure.
Figure 12:
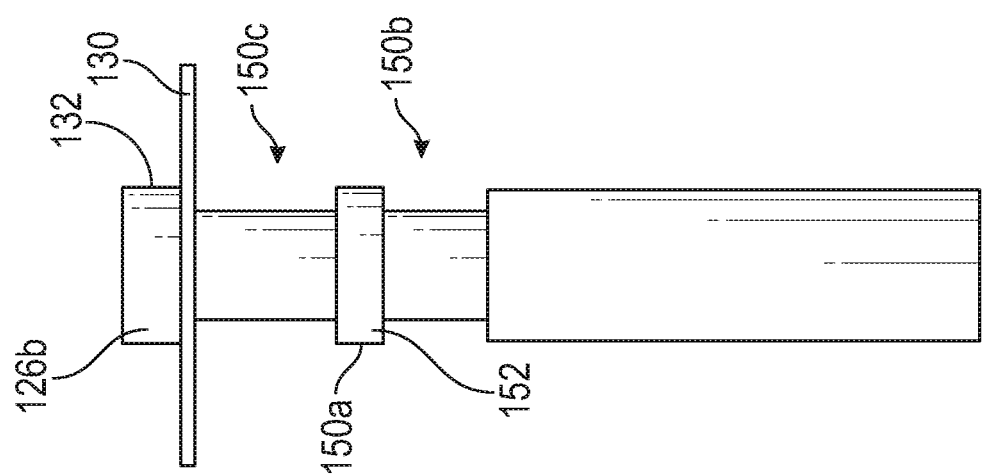
FIG. 12 is a simplified diagram of one of many embodiments of a core tube and detector according to the disclosure.
Figure 14A:
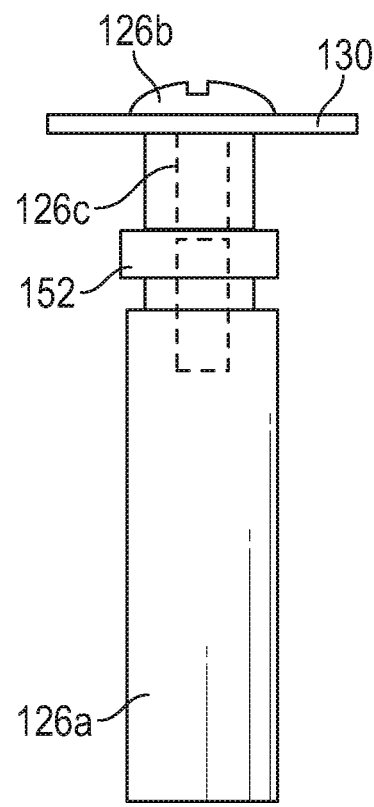
FIG. 14A is a simplified diagram of one of many embodiments of a core tube according to the disclosure.
Figure 14B:
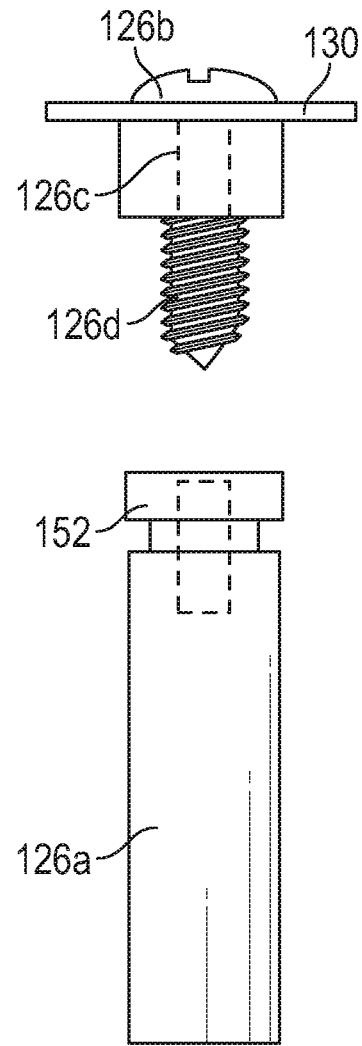
FIG. 14B is an exploded view of the core tube of FIG. 14A.
Figure 15:
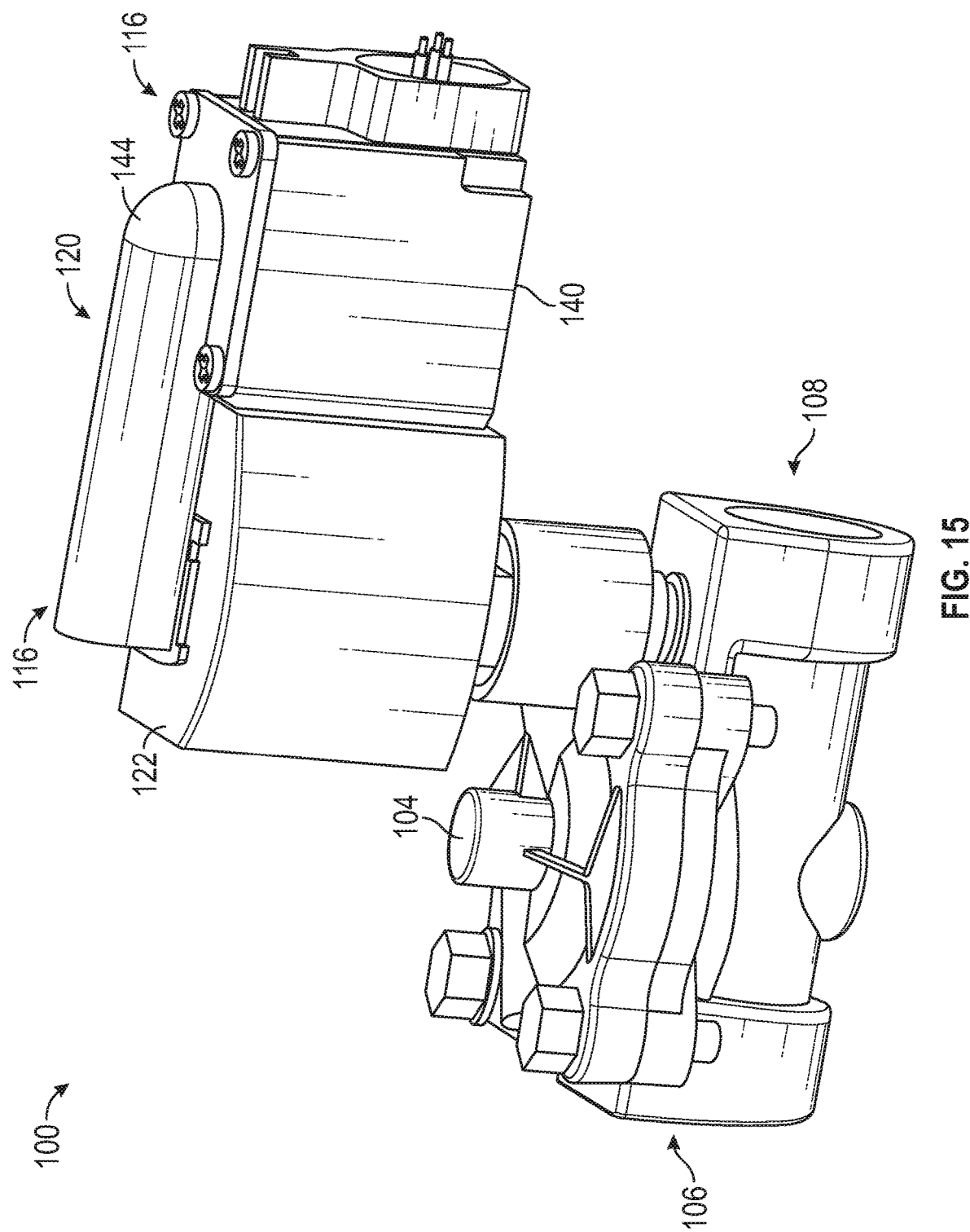
FIG. 15 is a perspective view of one of many embodiments of a valve and actuator system according to the disclosure.
Figure 16:
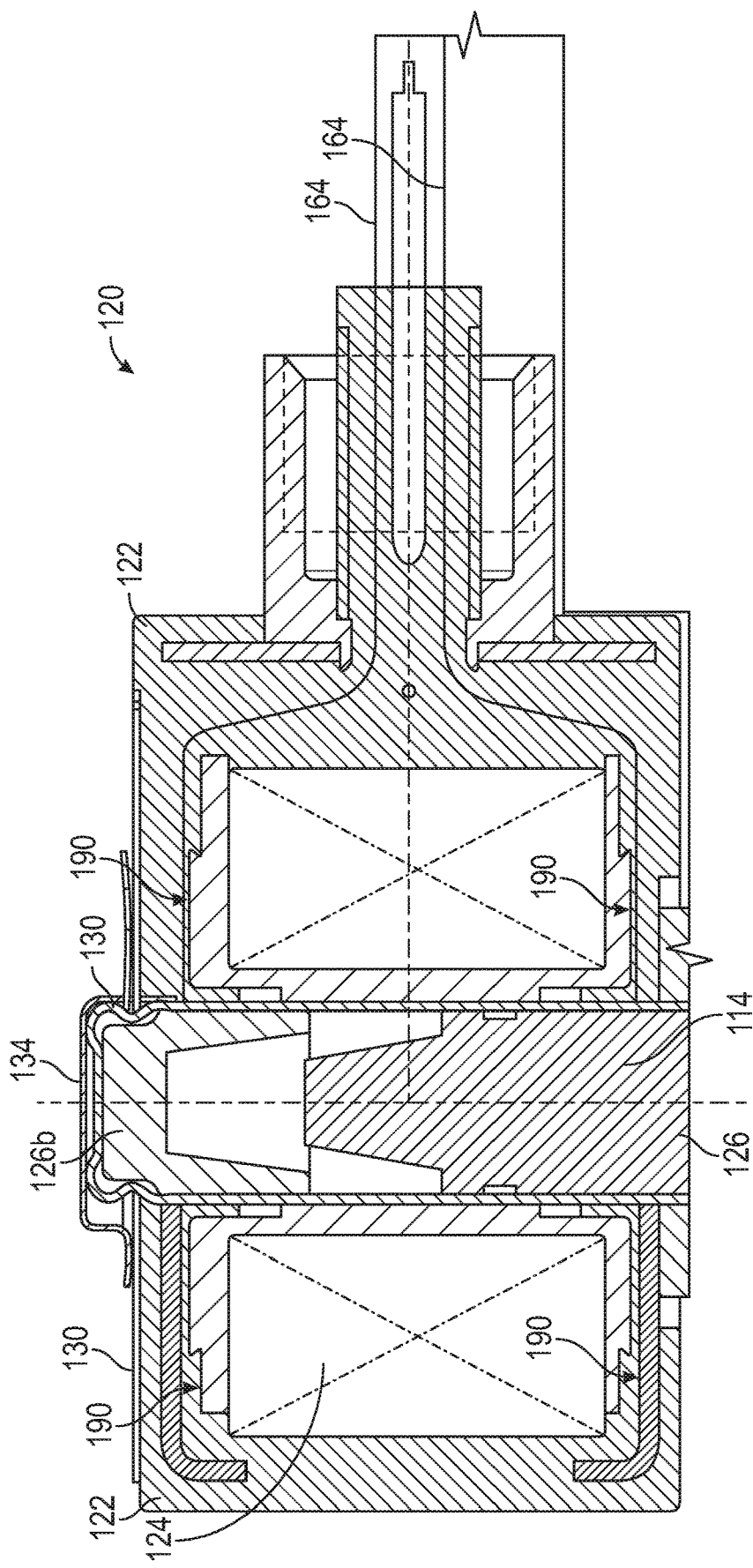
FIG. 16 is a side elevation sectional view of one of many embodiments of an actuator assembly according to the disclosure.
Figure 17:
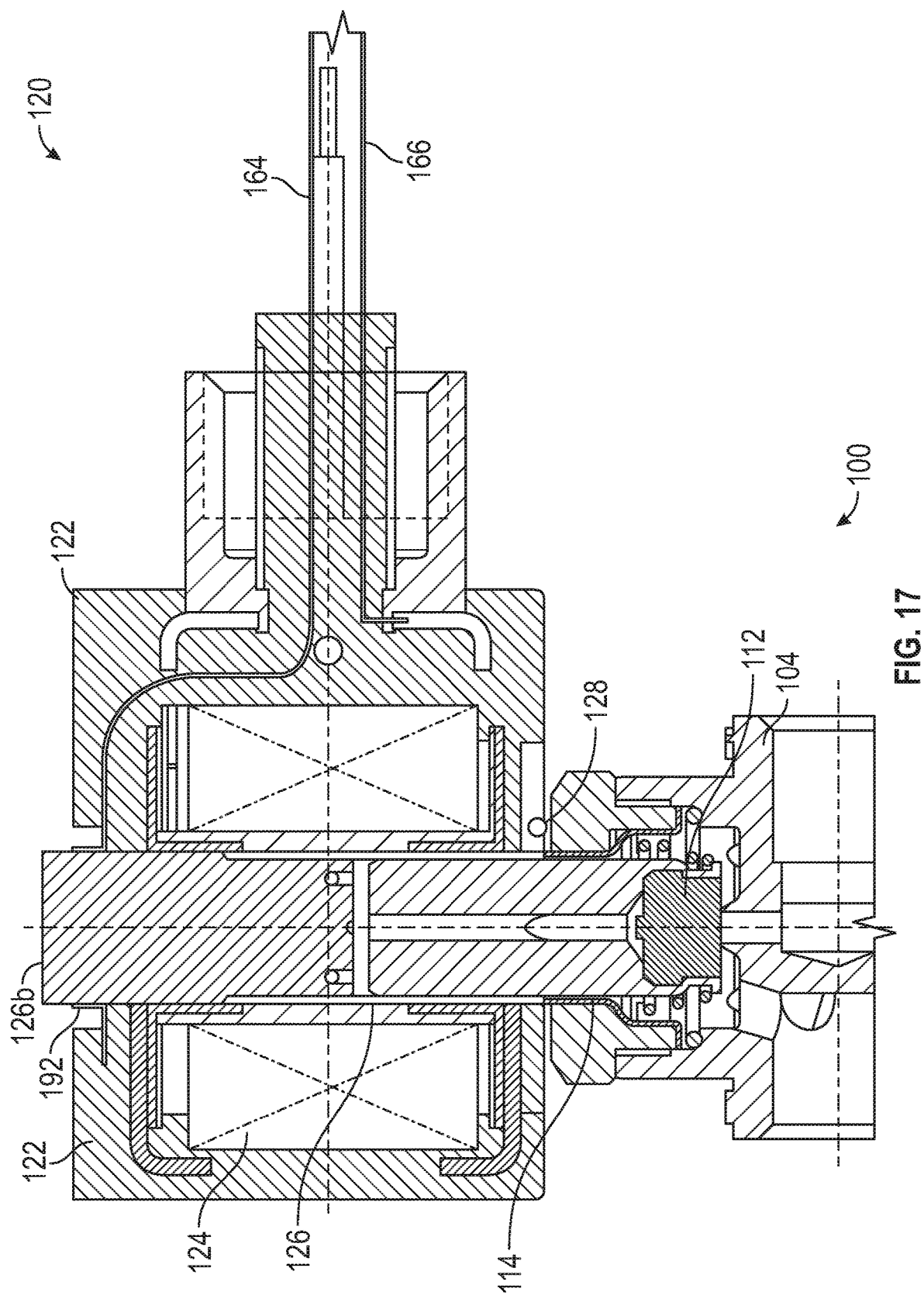
FIG. 17 is a side elevation sectional view of one of many embodiments of an actuator assembly according to the disclosure.
Figure 18:
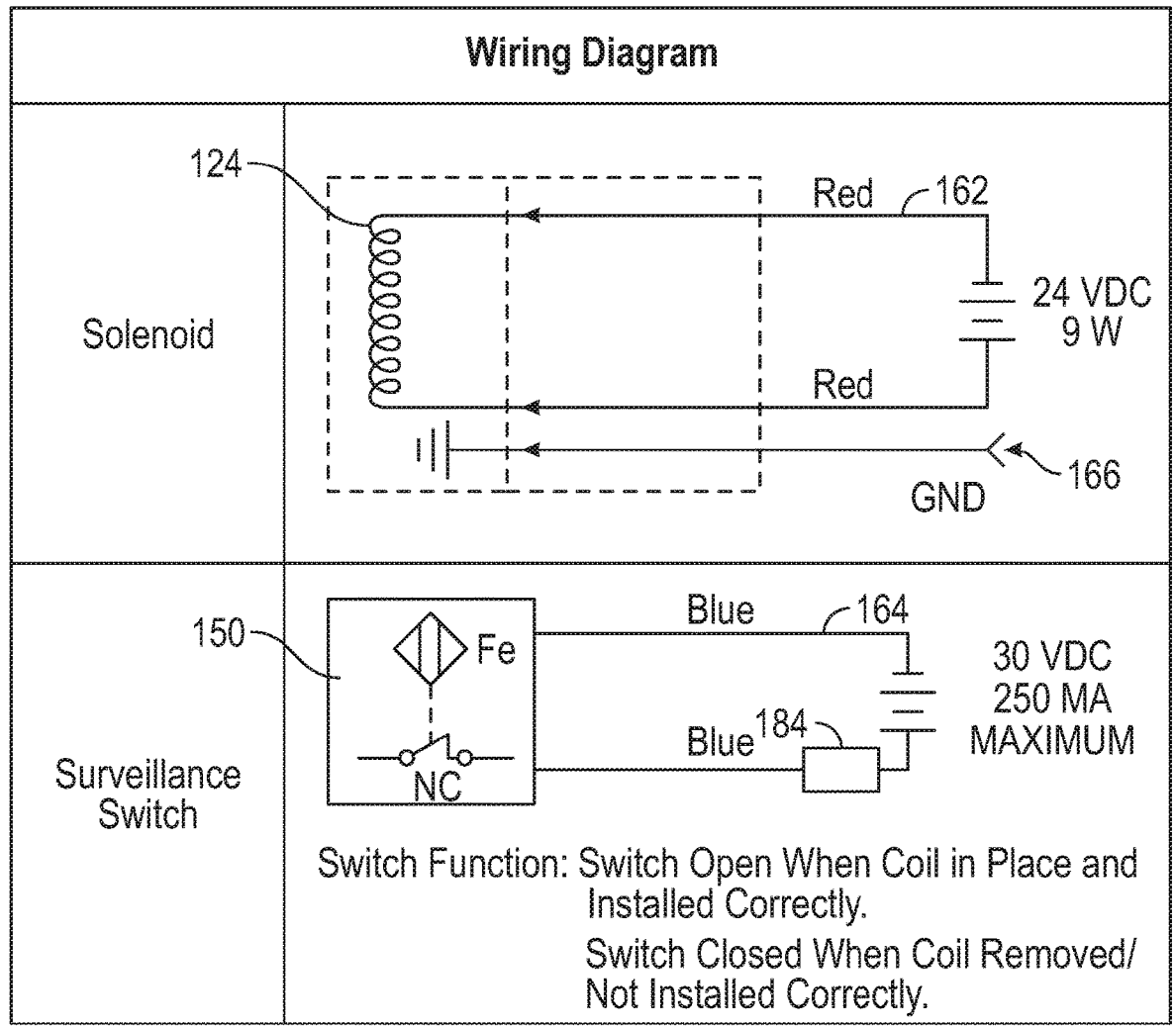
FIG. 18 is a schematic of one of many embodiments of a circuit of an actuator assembly according to the disclosure.
Figure 19:
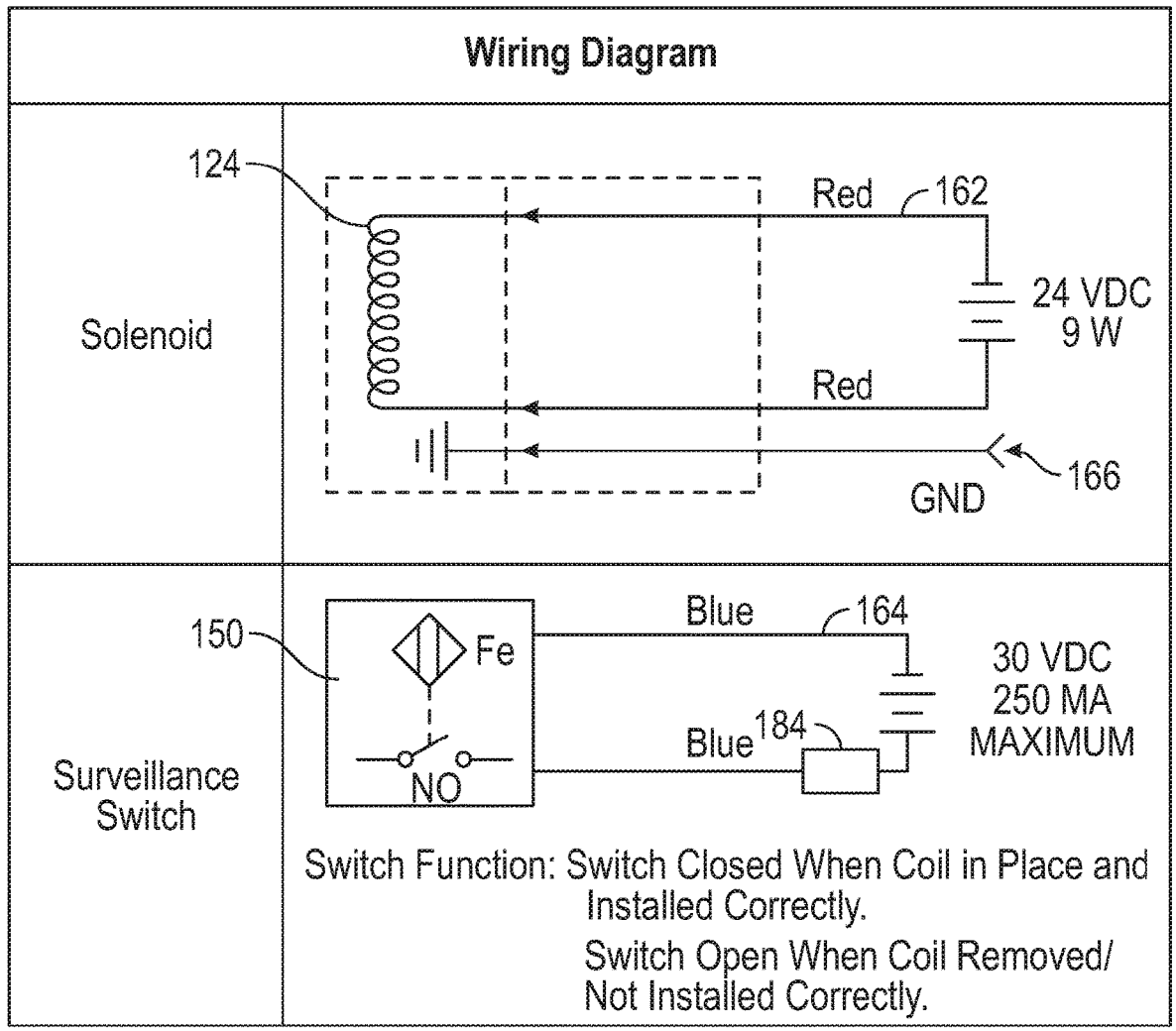
FIG. 19 is a schematic of one of many embodiments of a circuit of an actuator assembly according to the disclosure.

FIG. 1A is a perspective view of one of many embodiments of a valve and actuator system according to the disclosure. FIG. 1B is a perspective view of one of many embodiments of an actuator assembly according to the disclosure. FIG. 2A is a side elevational view of one of many embodiments of a valve and actuator system according to the disclosure. FIG. 2B is a side elevational view of one of many embodiments of an actuator assembly according to the disclosure with a portion cut away. FIG. 3A is a top plan view of one of many embodiments of a valve and actuator system according to the disclosure with a portion of a monitoring assembly cut away. FIG. 3B is a top plan view of one of many embodiments of an actuator assembly according to the disclosure with a portion of a monitoring assembly cut away. FIG. 4A is a side elevation sectional view of one of many embodiments of a valve and actuator system according to the disclosure. FIG. 4B is a side elevation sectional view of one of many embodiments of an actuator assembly according to the disclosure. FIG. 5A is a top plan view of one of many embodiments of a valve and actuator system according to the disclosure with a portion of a monitoring assembly cut away. FIG. 5B is a side elevational view of one of many embodiments of an actuator assembly according to the disclosure with a portion cut away. FIG. 6A is a top plan sectional view of one of many embodiments of an actuator assembly according to the disclosure. FIG. 6B is a side elevation sectional view of a portion of one of many embodiments of an actuator assembly according to the disclosure. FIG. 7 is a side elevation sectional view of one of many embodiments of an actuator assembly according to the disclosure. FIG. 8 is a perspective sectional view of a portion of one of many embodiments of an actuator assembly according to the disclosure. FIG. 9 is a simplified side elevation sectional view of one of many embodiments of an actuator assembly according to the disclosure. FIG. 10 is a partial exploded view of one of many embodiments of a monitoring assembly according to the disclosure. FIG. 11 is a partial side elevation sectional view of one of many embodiments of an actuator assembly according to the disclosure. FIG. 12 is a simplified diagram of one of many embodiments of a core tube and detector according to the disclosure. FIG. 13A is a simplified diagram of one of many embodiments of a core tube according to the disclosure. FIG. 13B is an exploded view of the core tube of FIG. 13A. FIG. 14A is a simplified diagram of one of many embodiments of a core tube according to the disclosure. FIG. 14B is an exploded view of the core tube of FIG. 14A. FIG. 15 is a perspective view of one of many embodiments of a valve and actuator system according to the disclosure. FIG. 16 is a side elevation sectional view of one of many embodiments of an actuator assembly according to the disclosure. FIG. 17 is a side elevation sectional view of one of many embodiments of an actuator assembly according to the disclosure. FIG. 18 is a schematic of one of many embodiments of a circuit of an actuator assembly according to the disclosure. FIG. 19 is a schematic of one of many embodiments of a circuit of an actuator assembly according to the disclosure. FIGS. 1-19 will be described in conjunction with one another.

In at least one embodiment, a solenoid valve, assembly or system 100 can include a valve assembly 102 and an actuator assembly 120. The valve assembly 102 can include a valve body 104 with an inlet 106 and an outlet 108 for selective flow through the valve 102. In at least one embodiment, the valve body 104 includes a diaphragm valve 110 operated by a pilot valve 112 controlled by a spring-loaded armature 114.

In at least one embodiment, the actuator assembly 120 can be coupled to the valve body 104 and be configured to control flow from the inlet 106 to the outlet 108. In at least one embodiment, the actuator assembly 120 comprises an actuator housing 122, a coil 124 disposed in the actuator housing 122, and a core tube 126. In at least one embodiment, the actuator housing 122 and the coil 124 can include a hole or passage through which the core tube 126, or a portion thereof, can extend. In at least one embodiment, the core tube 126 is secured to the valve body 104 and the spring-loaded armature 114 controlling the pilot valve 112 rides within the core tube 126.

In at least one embodiment, the actuator housing 122 can be slid onto the core tube 126, with the core tube 126 extending through the passage therein, against a spring 128 adjacent the valve body 104. In at least one embodiment, the actuator housing 122 can be secured onto the core tube 126 by pushing the actuator housing 122 the valve body 104, compressing the spring 128, and slipping a nameplate 130 under a lip, groove, or depression 132 near the distal end of the core tube 126. Once properly positioned, the nameplate 130 can retain the actuator housing 122 onto the core tube 126 against the spring 128. A decorative and/or protective cap 134 can be placed over the distal end of the core tube 126. The actuator housing 122 can be removed from the valve body 104 by reversing this process. Thus, in at least one embodiment, the actuator 120, or components thereof such as the actuator housing 122 and the coil 124, can be removed from the valve body 104 and replaced for service and/or maintenance. Of course, the valve body 104 can also be removed from the actuator 120 and replaced for service and/or maintenance.

In at least one embodiment, a first portion 126a of the core tube 126 can extend through the actuator housing 122 and/or the coil 124 while a second portion 126b of the core tube 126 extends beyond the actuator housing 122 and/or the coil 124, when the actuator 120 is properly installed on the valve body 104. In at least one embodiment, the core tube 126 extends from the valve body 104 and through the actuator housing 122 and coil 124, with the actuator 120 properly installed on the valve body 104.

While the core tube 126 has been described as part of the actuator assembly 120, in at least one embodiment, the core tube 126 can be part of the valve assembly 102. In at least one embodiment, the core tube 126 is integral to the valve body 104, or a portion thereof.

The assembly 100 can also include a monitoring assembly 116 for monitoring whether the actuator 120, or housing 122, is properly installed on the valve body 104 and/or core tube 126. In at least one embodiment, the monitoring assembly 116 includes a detector 150 and a target 152 positioned to confirm that the actuator 120, or housing 122, is properly installed on the valve body 104 and/or core tube 126. In at least one embodiment, the monitoring assembly 116 includes a target 152 on the core tube 126 and a detector 150 configured to detect whether or not the target 152 is present, and/or properly positioned. The detector 150 and the target 152 can be located such that the detector 150 is able to detect the target 152 when the actuator 120, or housing 122, is properly installed on the valve body 104 and/or core tube 126. In at least one embodiment, the detector 150 is not able to detect the target 152 when the actuator 120, or housing 122, is improperly installed on the valve body 104 and/or core tube 126.

In at least one embodiment, the detector 105 is mounted to the actuator 120, or housing 122, and therefore moves with the actuator 120, or housing 122, as it is removed and/or replaced upon the valve body 104 and/or core tube 126. In at least one embodiment, the target 152 is mounted to the core tube 126, and therefore moves with the valve body 104 and/or core tube 126 as it is removed and/or replaced with respect to the actuator 120, or its housing 122.

In at least one embodiment, the target 152 is mounted to the portion 126b of the core tube 126 that extends beyond the actuator housing 122 and/or the coil 124, when the actuator 120 is properly installed on the valve body 104. The second portion 126b of the core tube 126 that extends beyond the actuator housing 122 and/or the coil 124 can be integral to the core tube 126, or can be an extension attached to the first portion 126a, or another portion, of the core tube 126. In at least one embodiment, the second portion 126b of the core tube 126 comprises a head 126b that is spaced from the target 152 with a spacer 126c. In at least one embodiment, the second portion 126b of the core tube 126, or a portion thereof, is secured to another portion of the core tube 126a with a treaded connection 126d. This can allow for retrofit of the monitoring assembly 116 to other valve assemblies 102 and/or actuator assemblies 120. In at least one embodiment, the target 152 is spaced from the first portion 126a of the core tube 126 by a gap 126e.

Referring to FIG. 12, for example, when the actuator housing 122 and/or the coil 124 are in proper position relative to the valve body 104 and/or core tube 126, the detector 150a can be adjacent to, and therefore detect, the target 152 on the core tube 126. If, for example, the actuator housing 122 and/or the coil 124 are too far from the valve body 104 and/or too high on the core tube 126, the detector 150b can be adjacent to the gap 126e between the target 125 and the first portion of the core tube 126a, and cannot detect the target 152. If, for example, the actuator housing 122 and/or the coil 124 are too close to the valve body 104 and/or too low on the core tube 126, the detector 150c can be adjacent to the spacer 126c between the target 125 and the head of the second portion of the core tube 126b, and cannot detect the target 152.

In at least one embodiment, the detector 150 and/or the target 152 can be contained within the actuator housing 122, or can be external thereto. In at least one embodiment, such as that shown in FIG. 9, the detector 150 is disposed in the actuator housing 122 and the target 152 is disposed on the core tube 126 also within the actuator housing 122. In at least one embodiment, such as that shown in FIG. 15, the detector 150 and/or the target 152 can be located external to the actuator housing 122.

For example, the monitoring assembly 116 can include a junction box 140 which can be mounted to the actuator housing 122. The junction box 140 can include a cover 142. In at least one embodiment, a detector housing 144 is secured to the junction box 140 and can protect and/or house the detector 150. In at least one embodiment, the detector housing 144 can also protect and/or house the trigger 152 and/or second portion 126b. In at least one embodiment, the trigger 152 and/or second portion 126b extends into an opening in the detector housing 144. In at least one embodiment, a top of the junction box 140 is substantially flush with the actuator housing 122, such that the detector housing 144 sits above the actuator housing 122. In at least one embodiment, the detector housing 144 can be coupled to the actuator housing 122. In at least one embodiment, the detector 150 can be mounted above the actuator housing 122, and detect the trigger 152 when the trigger 152 is above, or beyond, the actuator housing 122. In at least one embodiment, the monitoring assembly 116 includes a spacer or trigger housing 146, which can be secured to the actuator housing 122 and which can protect and/or house the trigger 152 and/or second portion 126b. In at least one embodiment, a top of the detector housing 144 can be at least substantially flush with a top of the trigger housing 146. In at least one embodiment, the trigger housing 146 houses or covers at least a portion of the detector housing 144.

In at least one embodiment, the monitoring assembly 116 can include one or more gaskets 148 to seal the various housings 122, 140, 144, 146 to each other. The detector 150 can be covered, protected, or otherwise supported by a detector support 154 that can be integral to, or otherwise part of and/or within, the detector housing 144. In at least one embodiment, the monitoring assembly 116 can also include a terminal block 158 that can be sealed within the junction box 140 and/or to the actuator housing 122 with a seal 156. The terminal block 158 can be used to terminate or enable connections to the coil 124 and/or the detector 150.

In at least one embodiment, a communications link 160, such as a cable or bundle of wires, can be connected to the coil 124 and/or the detector 150 through the terminal block 158. For example, the communications link 160 can include wireless or wired communications. In at least one embodiment, the communications link 160 can include power and/or communications wiring 162 to power and/or control the coil 124. In at least one embodiment, the communications link 160 can include power and/or communications wiring 164 to power and/or control the detector 150. In at least one embodiment, the communications link 160 can include additional wiring 166, such as to provide safety and/or signal grounds to the coil 124 and/or the detector 150.

In at least one embodiment, the monitoring assembly 116 can include one or more integrity devices 168, such as a resistor, that can be used to monitor the integrity of the communications link 160. For example, as shown in FIG. 8, the integrity device 168 can include a resistor that confirms continuity in the detector wiring 164.

In at least one embodiment, the detector 150 can include a switch or other sensor, such as a mechanical microswitch or a magnetic proximity sensor. Example suitable micro switches include Honeywell's SM-series. Example suitable magnetic proximity sensors include those manufactured by Magnasphere and TopWorx, such as the 52M-series. In at least one embodiment, the target 152 can include a cam, tongue, groove, shoulder, other profile shape in the core tube 126, or on an external surface of the core tube 126. In at least one embodiment, the target 152 can be integral to the core tube 126 or can be secured to an end of the core tube 126, such as the second end 126b for the core tube, as discussed above. In at least one embodiment, such as where the detector 150 is a magnetic proximity sensor, the target 152 can include a ferromagnetic metal, permanently magnetic, or electromagnetic, and other portions of the core tube 126 can be non-magnetic. In at least one embodiment, such as where the detector 150 is a magnetic proximity sensor, the target 152 can be part of a ferromagnetic metal, permanently magnetic, or electromagnetic, endpiece 126b and other portions of the core tube 126 can be non-magnetic. In at least one embodiment, the target 152 can be part of an endpiece 126b connected to other portions of the core tube 126.

In at least one embodiment, the detector 150 is positioned to be proximate to, and/or in sensing communication with, the target 152 and/or the second portion 126b of the core tube 126, when the actuator 120 is properly or improperly installed on the valve body 104 and/or core tube 126. In at least one embodiment, the detector 150 is positioned to be distal to the target 152, when the actuator 120 is properly or improperly installed on the valve body 104 and/or core tube 126. In at least one embodiment, such as those shown in FIGS. 6A, 6B, 7 for example, the monitoring assembly 116 can include a shaft or stem 170 that can be biased toward the core tube 126, and/or away from the detector 150, by a spring 172. The monitoring assembly 116 can also include a seal 174, such as an O-ring, that permits the shaft 170 to sealingly slide within the detector housing 144. In at least one embodiment, the shaft includes an engagement end 176 that can include a ball, or other bearing, and that engages the cure tube 126, as the core tube sides through and/or beyond the actuator housing 122 and/or coil 124. As the engagement end 176 end of the shaft 170 engages, or contacts, the target 152 on the core tube 126, the shaft moves laterally, or perpendicularly, to the core tube 126, and a trigger or trigger end 178 trips or triggers the detector 150, such as a mechanical switch or other sensor.

In at least one embodiment, the monitoring assembly 116 can include or can be configured to trigger or otherwise provide an audible and/or visual indication, or indicator 184, of whether the target 152 is properly detected, and thus whether the actuator 120 is properly or improperly installed on the valve body 104 and/or core tube 126. For example, the detector wiring 164 can close or complete a circuit when the target 152 is properly detected, and thus when the actuator 120 is properly installed on the valve body 104 and/or core tube 126. In at least one embodiment, the detector wiring 164 can open a circuit when the target 152 is properly detected, and thus when the actuator 120 is properly installed on the valve body 104 and/or core tube 126. In at least one embodiment, the detector wiring 164 can open a circuit when the target 152 is not detected, and thus when the actuator 120 is improperly installed on the valve body 104 and/or core tube 126. In at least one embodiment, the detector wiring 164 can close or complete a circuit when the target 152 is not detected, and thus when the actuator 120 is improperly installed on the valve body 104 and/or core tube 126. That circuit can provide an audible and/or visual indication, or indicator 184, thereby allowing an operator or inspector to confirm that the actuator 120 is properly installed on the valve body 104 and/or core tube 126.

In at least one embodiment, such as that shown in FIG. 16, which is but one of many, the monitoring assembly 116 can include one or more detectors 150, such as electrical contacts or flux washers 190, positioned within the actuator housing 122 and/or adjacent the coil 124. In this example, the core tube 126 itself can be used to complete a circuit with the detector wiring 164 when the actuator 120 is properly installed on the valve body 104 and/or core tube 126. The detectors 150, such as the contacts or washers 190, can be positioned such that when the actuator 120 is improperly installed on the valve body 104 and/or core tube 126 the circuit remains open, thereby alerting an operator or inspector that the actuator 120 is improperly installed on the valve body 104 and/or core tube 126.

In at least one embodiment, such as that shown in FIG. 17, the monitoring assembly 116 can include one or more detectors 150, such as a contact sleeve 192, that is positioned within the actuator housing 122 and/or adjacent the coil 124. In this example, the core tube 126 itself can be used to complete a circuit between the detector wiring 164 and/or the ground or other wiring 166 when the actuator 120 is properly installed on the valve body 104 and/or core tube 126. The detectors 150, such as the contact sleeve 192, can be positioned such that when the actuator 120 is improperly installed on the valve body 104 and/or core tube 126 the circuit remains open, thereby alerting an operator or inspector that the actuator 120 is improperly installed on the valve body 104 and/or core tube 126.

In at least one embodiment, a valve's removable solenoid coil can incorporate a switch that is triggered by a target feature on the solenoid armature (core tube), which can be fixed to the valve body. A switch triggered by a target feature on the solenoid armature can detect whether the removable solenoid coil is installed correctly in the correct position, installed incorrectly/incompletely in an incorrect position, or not installed at all. At least one embodiment of the disclosure can accomplish this regardless of the rotational position of the solenoid coil about the armature/valve body and without need to align the target feature. The invention does not require (but can optionally include) an additional element to function as a target feature, as the target can be integral with a solenoid armature. The switch can be mechanical, optical, magnetic, or resistive. The target feature can be ferrous metal, magnetic, or reflective. The switch can be normally open, normally closed, NCNO, or progressively resistive. The switch can be mounted into an accessory structure on the solenoid coil, or integral within the enclosure of the solenoid coil. The switch can be coupled with an enclosure that provides environmental seal, electrical terminations, and/or electrical leads. At least one embodiment can provide an alarm signal or other indicator if a solenoid coil is or is not correctly installed, whether after removal for field servicing or otherwise. Solenoid valves used in fire suppression systems are one example of a commercial implementation of the disclosure. For instance, at least one embodiment of the disclosure can comply with NFPA-13. Other exemplary implementations of the disclosure include solenoid valve applications where the sensing and/or indicating aspects of the disclosure are needed or desired.

In at least one embodiment, a solenoid valve can include a valve body and an actuator. The valve body can include an inlet and an outlet for selective flow through the valve. The actuator can be coupled to the valve body and be configured to control flow from the inlet to the outlet. In at least one embodiment, the actuator comprises an actuator housing, a coil disposed in the actuator housing, and a core tube. In at least one embodiment, a portion of the core tube can extend through the coil while another portion of the core tube extends beyond the coil, when the actuator is properly installed on the valve body. In at least one embodiment, the core tube extends from the valve body and through the actuator housing and coil, with the actuator properly installed on the valve body.

In at least one embodiment, a solenoid valve can also include a monitoring assembly for monitoring whether the actuator is properly installed on the valve body and/or core tube. In at least one embodiment, the monitoring assembly includes a target on the core tube and a detector configured to detect whether or not the target is present. The detector and the target can be located such that the detector is able to detect the target when the actuator is properly installed on the valve body and/or core tube. In at least one embodiment, the detector is not able to detect the target when the actuator is improperly installed on the valve body and/or core tube.

In at least one embodiment, the monitoring assembly can be configured to trigger or provide an audible and/or visual indication of whether the target is detected. In at least one embodiment, the monitoring assembly can be configured to trigger or provide an audible and/or visual indication of whether the actuator is properly or improperly installed on the valve body and/or core tube. In at least one embodiment, the detector can include a switch or other sensor, such as a mechanical microswitch or a magnetic proximity switch. In at least one embodiment, the target can include a cam or other target profile in the core tube. In at least one embodiment, the target can be integral to the core tube or can be secured to an end of the core tube. In at least one embodiment, the target can include a ferromagnetic metal and the remaining portion of the core tube can be non-ferromagnetic. In at least one embodiment, the detector and/or the target can be contained within the actuator housing, or can be external thereto. In at least one embodiment, the detector is disposed on the actuator housing and the target is disposed on the core tube.

Other and further embodiments utilizing one or more aspects of the disclosure can be devised without departing from the spirit of Applicants' disclosure. For example, the devices, systems and methods can be implemented for valves of numerous different types and sizes in numerous different industries. Further, the various methods and physical embodiments can be included in combination with each other to produce variations of the disclosed methods and embodiments. Discussion of singular elements can include plural elements and vice-versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. One or more aspects and embodiments of the disclosure are shown and/or described in more detail in the appended figures. The aspects and embodiments reflected in the figures are for purposes of explanation and illustration and are in no way intended to limit the scope of the present disclosure.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the claims.

What is claimed is:

1. A solenoid valve, comprising:
   a valve body having an inlet and an outlet;
   an actuator assembly coupled to the valve body and configured to control flow from the inlet to the outlet, wherein the actuator assembly comprises an actuator including a housing and a coil disposed in the housing, and a core tube having a first portion disposed at least partially through the coil and a second portion that extends beyond an end of the coil opposite the valve body when the actuator assembly is operably coupled to the valve body, wherein the actuator is configured to be removably and slideably disposed onto the core tube; and
   a monitoring assembly configured to monitor whether the actuator is operably disposed onto the core tube, the monitoring assembly comprising
   a detector; and
   a target fixedly disposed on the second portion of the core tube;
   wherein the detector is configured to detect at least one of presence of the target, absence of the target and a combination thereof.

2. The solenoid valve of claim 1, wherein the detector comprises at least one of a switch and a sensor.

3. The solenoid valve of claim 1, wherein the monitoring assembly is configured to initiate at least one of an audible indication and a visual indication when the target is present or absent.

4. The solenoid valve of claim 1, wherein the monitoring assembly comprises at least one of an audible indicator and a visual indicator operably coupled to the detector.

5. The solenoid valve of claim 1, wherein the detector comprises
   a stem having a first end and a second end longitudinally opposite the first end; and
   a switch;
   wherein the stem is biased away from the switch; and
   wherein the second end of the stem is configured to open or close the switch when the first end of the stem is in contact with the target.

6. The solenoid valve of claim 5, wherein the target comprises at least one of a cam, a tongue, a groove, a shoulder and a target profile on an exterior surface of the second portion of the core tube.

7. The solenoid valve of claim 1, wherein the detector comprises
   a proximity switch mounted in sensing communication with the second portion of the core tube when the actuator is operably disposed onto the core tube; and wherein the proximity switch is configured to open or close in response to presence or absence of the target.

8. The solenoid valve of claim 7, wherein the proximity switch is a magnetic proximity switch and the target comprises at least one of a permanent magnet and a ferromagnetic metal.

9. The solenoid valve of claim 8, wherein the second portion of the core tube comprises an endpiece coupled to a body of the core tube, and wherein the endpiece includes the target.

10. The solenoid valve of claim 9, wherein the endpiece comprises ferromagnetic metal and the body of the core tube is non-ferromagnetic.

11. The solenoid valve of claim 9, wherein the endpiece is disposed through an opening in the housing when the actuator is operably disposed onto the core tube, and further comprising a retainer coupled to the endpiece and configured to hold the actuator in an operable position relative to the core tube.

12. The solenoid valve of claim 1, wherein the target is disposed at least partially within the core tube.

13. The solenoid valve of claim 1, wherein at least one of the detector and the target is housed within the housing.

14. The solenoid valve of claim 1, wherein the detector is housed within the housing.

15. The solenoid valve of claim 14, wherein the detector comprises a stem having a longitudinal axis that is at least substantially perpendicular to a longitudinal axis of the core tube.

16. The solenoid valve of claim 1, wherein the detector is configured to detect at least one of presence of the target, absence of the target and a combination thereof regardless of a rotational position of the coil relative to the core tube.

17. A monitoring assembly for a solenoid valve having an actuator housing, a coil disposed in the actuator housing, and a core tube, the monitoring assembly comprising:
 a target; and
 a detector configured to detect at least one of presence of the target, absence of the target and a combination thereof;
 wherein the detector comprises a stem having a longitudinal axis that is at least substantially perpendicular to a longitudinal axis of the core tube;
 wherein the detector is configured to be mounted to the actuator housing;
 wherein the target is configured to be fixedly attached to a portion of the core tube that extends beyond an end of the coil opposite a valve body of the solenoid valve when the actuator housing and coil are operably coupled to the valve body; and
 wherein the monitoring assembly is configured to monitor whether the actuator housing and the coil are operably disposed onto the core tube.

18. The monitoring assembly of claim 17, further comprising a detector housing configured to be coupled to the actuator housing and wherein the detector housing is configured to house the detector.

19. A solenoid valve, comprising:
 a valve body having an inlet and an outlet;
 an actuator assembly coupled to the valve body and configured to control flow from the inlet to the outlet, wherein the actuator assembly comprises a core tube extending from the valve body and an actuator including a housing containing a coil, wherein the core tube extends at least partially through the coil and the housing when the actuator is operably installed on the core tube and wherein the actuator is configured to be removably and slideably disposed onto the core tube; and
 a monitoring assembly configured to monitor whether the actuator is operably disposed onto the core tube, the monitoring assembly comprising
  a detector housing disposed on a side of the coil opposite the valve body, wherein the core tube extends at least partially through the detector housing when the actuator is operably disposed onto the core tube;
  a target fixedly disposed on the core tube; and
  a detector housed within the detector housing;
  wherein the detector is configured to detect the presence and/or absence of the target at a location within the detector housing.

20. The solenoid valve of claim 19, wherein the detector housing is external to the housing, and wherein the housing is positioned between the valve body and the detector housing.

* * * * *